(12) United States Patent
Hamaguchi et al.

(10) Patent No.: US 12,463,424 B2
(45) Date of Patent: Nov. 4, 2025

(54) POWER REGULATION METHOD AND POWER REGULATION DEVICE

(71) Applicant: IHI Corporation, Koto-ku (JP)

(72) Inventors: Kenichi Hamaguchi, Koto-ku (JP); Akinobu Inamura, Koto-ku (JP); Yuji Koguma, Koto-ku (JP)

(73) Assignee: IHI Corporation, Koto-ku (JP)

( * ) Notice: Subject to any disclaimer, the term of this patent is extended or adjusted under 35 U.S.C. 154(b) by 262 days.

(21) Appl. No.: 17/997,065

(22) PCT Filed: Jul. 28, 2021

(86) PCT No.: PCT/JP2021/027924
§ 371 (c)(1),
(2) Date: Oct. 25, 2022

(87) PCT Pub. No.: WO2022/054442
PCT Pub. Date: Mar. 17, 2022

(65) Prior Publication Data
US 2023/0352937 A1   Nov. 2, 2023

(30) Foreign Application Priority Data

Sep. 11, 2020   (JP) .................................. 2020-152795

(51) Int. Cl.
*H02J 3/00*   (2006.01)
*H02J 3/38*   (2006.01)

(52) U.S. Cl.
CPC .............. *H02J 3/003* (2020.01); *H02J 3/381* (2013.01); *H02J 2203/20* (2020.01)

(58) Field of Classification Search
CPC ........ H02J 3/003; H02J 3/381; H02J 2203/20; H02J 3/00; H02J 3/14; H02J 3/32; Y02B 70/3225; Y04S 20/222
See application file for complete search history.

(56) References Cited

U.S. PATENT DOCUMENTS

2014/0079593 A1 *   3/2014   Naito .................. B01J 19/0046
                                                   422/111
2015/0012144 A1      1/2015   Wang et al.
(Continued)

FOREIGN PATENT DOCUMENTS

JP   2015-204698 A   11/2015
JP   2016-59185 A     4/2016
(Continued)

OTHER PUBLICATIONS

International Search Report Issued Sep. 21, 2021, in PCT/JP2021/027924, filed on Jul. 28, 2021, 2 pages.

*Primary Examiner* — Zhipeng Wang
(74) *Attorney, Agent, or Firm* — Oblon, McClelland, Maier & Neustadt, L.L.P.

(57) ABSTRACT

There is provided a power adjustment method in a microgrid connected to an external power supply system and having a power storage unit capable of adjusting an amount of stored power by charging and discharging and a power consumption unit capable of adjusting power consumption of the power. The power adjustment method includes adjusting transmission and reception of the power by simultaneously controlling the power consumption in the power consumption unit and charge/discharge power in the power storage unit in order to transmit and receive power based on a planned value determined for each planned section to and from the external power supply system.

6 Claims, 18 Drawing Sheets

(56) References Cited

U.S. PATENT DOCUMENTS

| | | |
|---|---|---|
| 2015/0046222 A1 | 2/2015 | Ishii |
| 2018/0018850 A1* | 1/2018 | Sato ........................ H02J 3/322 |
| 2019/0386491 A1* | 12/2019 | Ito ........................ H01M 8/0606 |
| 2021/0021131 A1* | 1/2021 | Hanayama ................ H02J 3/38 |
| 2021/0305606 A1 | 9/2021 | Murai et al. |

FOREIGN PATENT DOCUMENTS

| | | |
|---|---|---|
| JP | 2018-85861 A | 5/2018 |
| JP | 2020-54085 A | 4/2020 |
| WO | WO 2013/115318 A1 | 8/2013 |
| WO | WO 2016/129034 A1 | 8/2016 |
| WO | WO 2016/143239 A1 | 9/2016 |
| WO | WO 2020/121436 A1 | 6/2020 |

\* cited by examiner

POWER REGULATION METHOD AND POWER REGULATION DEVICE

TECHNICAL FIELD

The present disclosure relates to a power adjustment method and a power adjustment device.

BACKGROUND ART

A planned value same time and same amount system has been introduced between a general power company and a business operator that operates a microgrid connected to an external power system constructed by the general power company or the like. In this system, the business operator incurs imbalance costs based on the difference (imbalance) between the plan submitted by the business operator before the actual supply and demand and the actual power generation and demand results. For this reason, on the business operator side, power adjustment to minimize the imbalance is required from the viewpoint of cost control.

For example, Patent Literature 1 describes a device that adjusts the amount of power demand so as not to deviate from the target range by controlling the charging and discharging of the storage battery. However, in the case of such a configuration, it is necessary to increase the capacity of the storage battery, which may directly lead to a cost increase.

On the other hand, in recent years, a method of combining pieces of equipment that consume power has been studied. For example, Patent Literature 2 discloses a system that monitors and controls the imbalance by combining hydrogen production equipment, a fuel cell, and a storage battery in a facility where photovoltaic power generation equipment is required. Specifically, Patent Literature 1 describes that an adjustment is made by consuming power in the hydrogen production equipment when the actual value of the surplus power used for power consignment exceeds the predicted value and the SOC of the storage battery exceeds the set value.

CITATION LIST

Patent Literature

Patent Literature 1: Japanese Unexamined Patent Publication No. 2015-204698
Patent Literature 2: Japanese Unexamined Patent Publication No. 2020-54085

SUMMARY OF INVENTION

Technical Problem

When adjusting the surplus power by using the method of Patent Literature 2, if the capacity of the storage battery is small, adjustment by the hydrogen production equipment is considered to be the main adjustment. However, equipment that consumes power, such as hydrogen production equipment, has a lower response speed than the storage battery. For this reason, it is considered difficult to make an adjustment between the actual value and the predicted value.

The present disclosure has been made in view of the above, and it is an object of the present disclosure to provide a technique capable of accurately adjusting the amount of transmitted and received power based on a planned value set in association with an external power supply system while preventing a cost increase.

Solution to Problem

A power adjustment method according to an aspect of the present disclosure is a power adjustment method in a microgrid connected to an external power supply system and having a power storage unit capable of adjusting an amount of stored power by charging and discharging and a power consumption unit capable of adjusting power consumption of the power. The power adjustment method includes adjusting transmission and reception of the power by simultaneously controlling the power consumption in the power consumption unit and charge/discharge power in the power storage unit in order to transmit and receive power based on a planned value determined for each planned section to and from the external power supply system.

Effects of Invention

According to the present disclosure, there is provided a technique capable of accurately adjusting the amount of transmitted and received power based on the planned value set in association with an external power supply system while preventing a cost increase.

DESCRIPTION OF EMBODIMENTS

Figure 1:
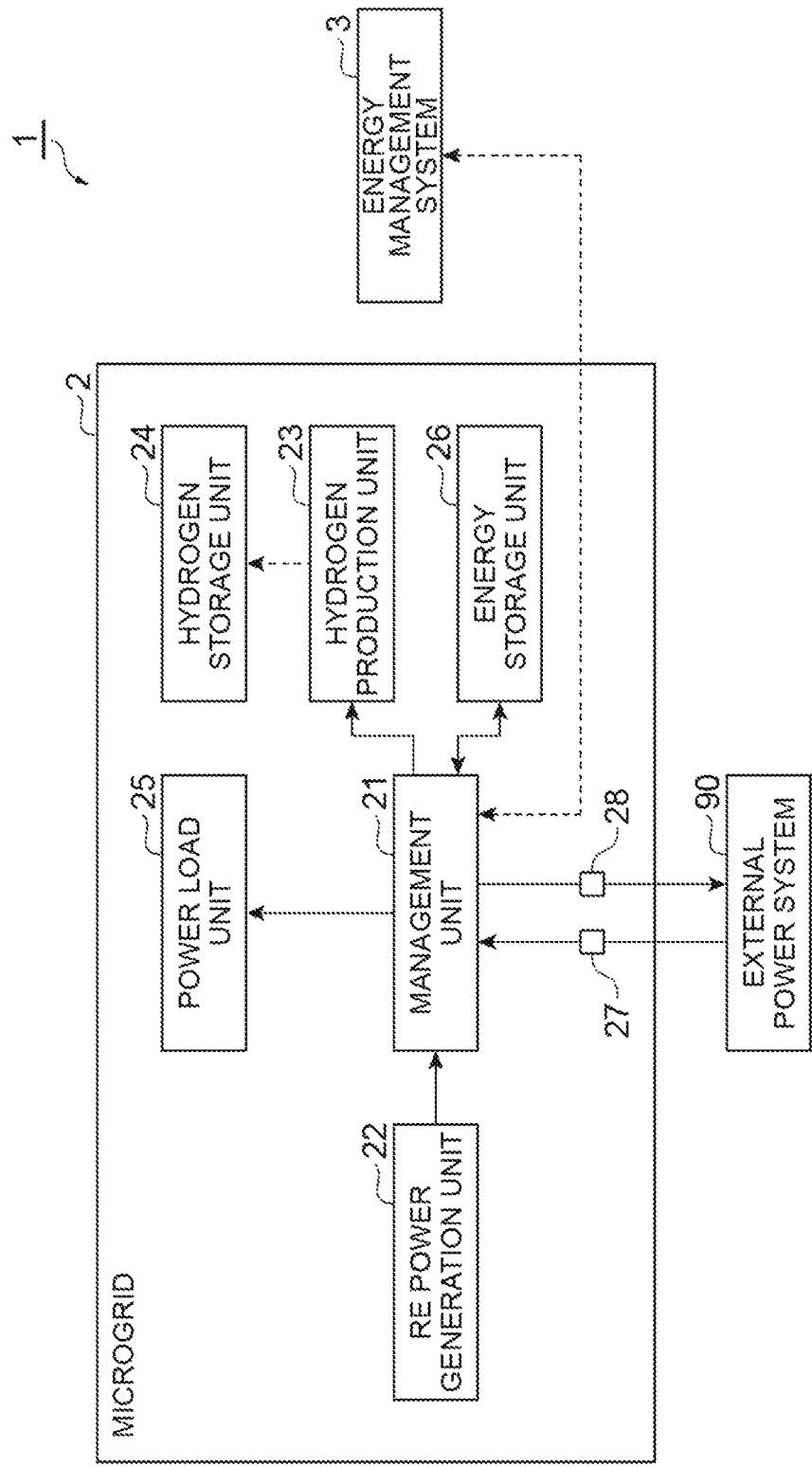
FIG. 1 is a schematic diagram of a power supply system of an embodiment.

A power adjustment method according to an aspect of the present disclosure is a power adjustment method in a microgrid connected to an external power supply system and having a power storage unit capable of adjusting an amount of stored power by charging and discharging and a power consumption unit capable of adjusting power consumption of the power. The power adjustment method includes adjusting transmission and reception of the power by simultaneously controlling the power consumption in the power consumption unit and charge/discharge power in the power storage unit in order to transmit and receive power based on a planned value determined for each planned section to and from the external power supply system.

According to the power adjustment method described above, by simultaneously controlling the power consumption in the power consumption unit and charge/discharge power in the power storage unit, adjustments are made to transmit and receive power based on the planned value determined for each planned section to and from the external power supply system. By combining the adjustment of the power consumption in the power consumption unit having a low response speed and the adjustment of the amount of storage in the power storage unit, which has a high response speed but of which cost tends to be high, it is possible to adjust the amount of transmitted and received power with high accuracy while suppressing the cost.

In the adjustment, a target value of the power consumption in the power consumption unit may be determined at a period of the planned section or a period shorter than the planned section, and the charging and discharging in the power storage unit may be controlled so that a difference between a target trajectory, which is a fluctuation curve of an integrated value of the power transmitted and received to and from the external power supply system in the planned section for realizing the planned value, and an integrated actual value of the power transmitted and received to and from the external power supply system is reduced.

As described above, by determining the target value of the power consumption in the power consumption unit having a lower response speed than the power storage unit at a period of the planned section or a period shorter than the planned section, it is possible to make a rough adjustment based on the planned value by using the power consumption unit. On the other hand, by adopting the configuration in which the charge/discharge power in the power storage unit is controlled so that the difference between the target trajectory, which is the fluctuation curve of the integrated value of the power transmitted and received to and from the external power supply system in the planned section, and an integrated actual value of the power transmitted and received to and from the external power supply system is reduced, the difference between the target trajectory and the integrated actual value can be adjusted smaller by adjustment using the power storage unit having a higher response speed than the power consumption unit. Since the adjustment by the power storage unit is a fine adjustment, it is possible to prevent an increase in the size of the power storage unit.

In the adjustment, the target value of the power consumption in the power consumption unit may be determined so that the integrated value of the power transmitted and received to and from the external power supply system matches or asymptotically approaches the target trajectory at a time of at least one predetermined point in a future by using a predicted value or a current value of a power demand in the microgrid.

As described above, by determining the target value of the power consumption in the power consumption unit so that the integrated value of the transmitted and received power matches or asymptotically approaches the target trajectory by using the predicted value or the current value of the power demand in the microgrid, it is possible to adjust the amount of transmitted and received power more accurately in consideration of the power demand.

The microgrid may further have a power generation unit that generates the power. In the adjustment, the target value of the power consumption in the power consumption unit may be determined so that the integrated value of the power transmitted and received to and from the external power supply system matches or asymptotically approaches the target trajectory at a time of at least one predetermined point in a future by using a current value or a predicted value relevant to the power generated by the power generation unit.

As described above, by determining the target value of the power consumption in the power consumption unit so that the integrated value of the transmitted and received power matches or asymptotically approaches the target trajectory by using the predicted value or the current value relevant to the power generated by the power generation unit, it is possible to adjust the amount of transmitted and received power more accurately in consideration of the amount of generation by the power generation unit.

In the adjustment, the target value of the power consumption in the power consumption unit may be determined so that a remaining capacity of the power storage unit is within a target range at a time of at least one predetermined point in a future.

As described above, by determining the target value of the power consumption in the power consumption unit so that the remaining capacity of the power storage unit is within the target range, it is possible to maintain the remaining capacity of the power storage unit in a state suitable for adjusting the charge/discharge power. Therefore, it is possible to flexibly respond to a change in the planned value to make an adjustment.

In the adjustment, a target value of the power consumption in the power consumption unit may be determined at a period of the planned section or a period shorter than the planned section, and the charging and discharging in the power storage unit may be controlled so that a difference between a target value of the power transmitted and received to and from the external power supply system in order to realize the planned value and an actual value of the power transmitted and received to and from the external power supply system is reduced.

As described above, by determining the target value of the power consumption in the power consumption unit having a lower response speed than the power storage unit at a period of the planned section or a period shorter than the planned section, it is possible to make a rough adjustment based on the planned value by using the power consumption unit. On the other hand, by adopting the configuration in which the charge/discharge power in the power storage unit is controlled so that the difference between the target value of the power transmitted and received to and from the external power supply system in the planned section and the actual value of the power transmitted and received to and from the external power supply system is reduced, the difference between the target value and the actual value can be adjusted smaller by adjustment using the power storage unit having a higher response speed than the power consumption unit. Since the adjustment by the power storage unit is a fine adjustment, it is possible to prevent the power storage unit from becoming large.

A power adjustment device according to an aspect of the present disclosure is a power adjustment device in a microgrid connected to an external power supply system and having a power storage unit capable of adjusting an amount of stored power by charging and discharging and a power consumption unit capable of adjusting power consumption of the power. The power adjustment device includes a control unit that adjusts transmission and reception of the power by simultaneously controlling the power consumption in the power consumption unit and charge/discharge power in the power storage unit in order to transmit and receive power based on a planned value determined for each planned section to and from the external power supply system.

According to the power adjustment device described above, since the control unit simultaneously controls the power consumption in the power consumption unit and charge/discharge power in the power storage unit, adjustments are made to transmit and receive power based on the planned value determined for each planned section to and from the external power supply system. By combining the adjustment of the power consumption in the power consumption unit having a low response speed and the adjustment of the charge/discharge power in the power storage unit, which has a high response speed but of which cost tends to be high, it is possible to adjust the amount of transmitted and received power with high accuracy while suppressing the cost.

Hereinafter, a form for carrying out the present disclosure will be described in detail with reference to the accompanying diagrams. In addition, in the description of the diagrams, the same elements are denoted by the same reference numerals, and repeated description thereof will be omitted.

[Power Supply System]

Figure 2:
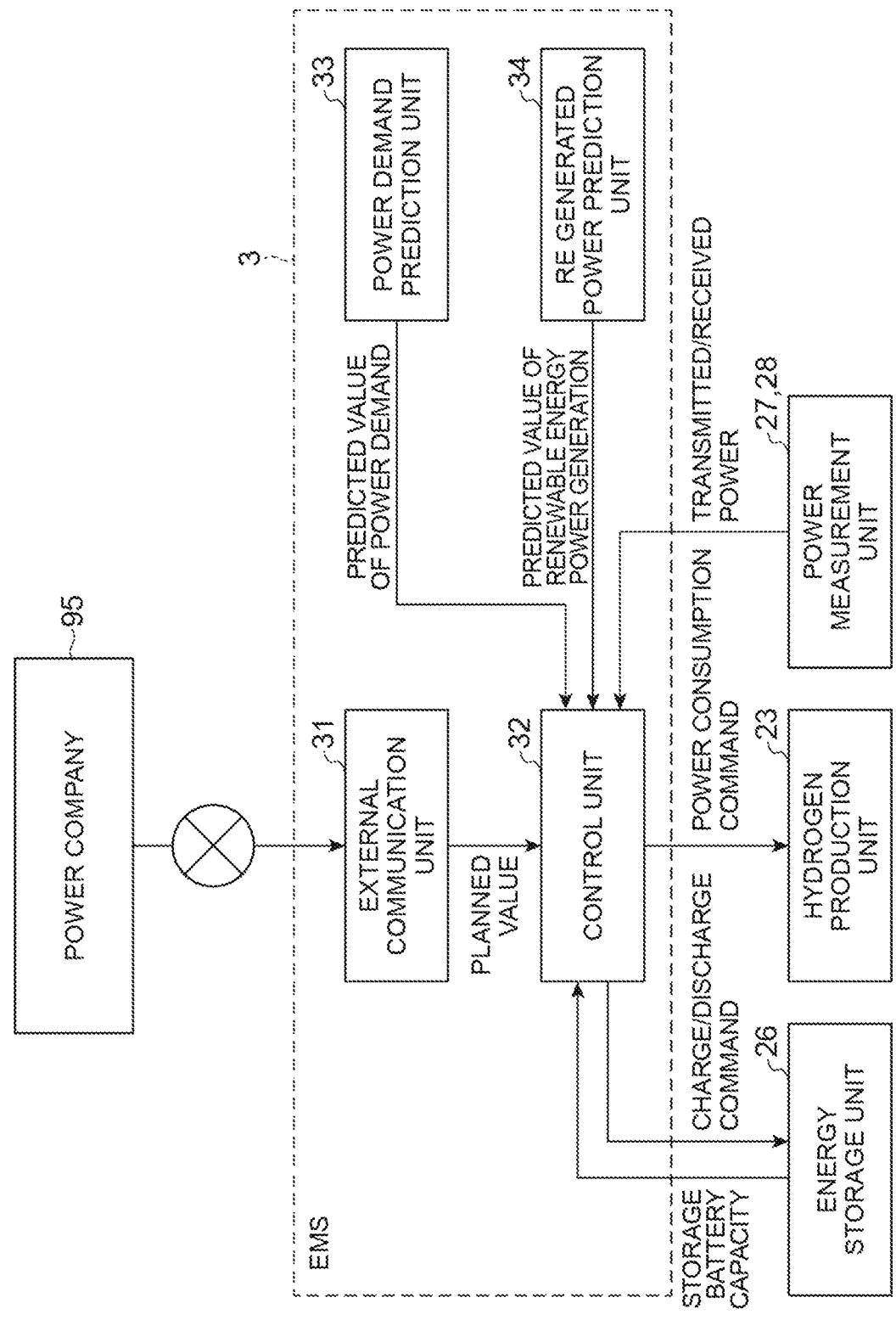
FIG. 2 is a schematic diagram describing the function of an energy management system included in the power supply system.

First, a schematic configuration of a power supply system 1 will be described with reference to FIGS. 1 and 2. FIG. 1 is a schematic diagram of a power supply system according to an embodiment. In addition, FIG. 2 is a schematic diagram illustrating the function of an energy management system included in the power supply system. The power supply system 1 includes a microgrid 2 and an energy management system 3 (power adjustment device). Hereinafter, the "energy management system" will be referred to as an "EMS". The microgrid 2 includes a management unit 21, an RE power generation unit 22, a hydrogen production unit 23 (power consumption unit), a hydrogen storage unit 24, a power load unit 25, an energy storage unit 26 (power storage unit), a received power measurement unit 27, and a transmitted power measurement unit 28.

The microgrid 2 is connected to an external power system 90 (external power supply system). The microgrid 2 can receive the insufficient power from the external power system 90. That is, a part of the power required in the microgrid 2 can be supplied from the external power system 90. The power supplied from the external power system 90 is measured by the received power measurement unit 27.

In addition, the microgrid 2 can supply surplus power to the external power system 90. That is, a part of the power output by the RE power generation unit 22 of the microgrid 2 can flow out to the external power system 90. The power supplied to the external power system 90 is measured by the transmitted power measurement unit 28.

The management unit 21 is connected to the external power system 90. The management unit 21 manages the flow of power between the external power system 90 and the RE power generation unit 22, the hydrogen production unit 23, the power load unit 25, and the energy storage unit 26. The management unit 21 controls, for example, the RE power generation unit 22, the hydrogen production unit 23, and the energy storage unit 26 according to the output from the EMS 3.

The RE power generation unit 22 generates power by using renewable energy. In the present embodiment, the RE power generation unit 22 may be, for example, a solar power generation system, a wind power generation system, a geothermal power generation system, a biomass power generation system, or a waste power generation system.

The RE power generation unit 22 supplies the generated power to the hydrogen production unit 23, the power load unit 25, and the energy storage unit 26 in response to a control command from the management unit 21. In addition, the amount of power generated by the RE power generation unit 22 may change depending on the external environment such as the weather.

The microgrid 2 may not be configured to include a power generation function such as the RE power generation unit 22. However, the configuration described in the following embodiment has the effect of suppressing disturbance factors (for example, fluctuation factors of the amount of power generated by the RE power generation unit 22) for received power or transmitted power (details will be described later). Therefore, the control described in the following embodiment is suitable for a case where the microgrid 2 includes a generator whose fluctuation in the amount of generated power is not easy to predict (in other words, it is difficult to generate power as planned), such as the RE power generation unit 22. The RE power generation unit 22 illustrated above has such a characteristic that a fluctuation in the amount of generated power cannot be predicted. For example, when the RE power generation unit 22 generates solar power, the amount of generated power fluctuates greatly due to the influence of weather conditions (solar radiation, temperature, and snowfall). In addition, in the case of wind power generation, the amount of generated power fluctuates due to the influence of wind speed. In addition, regarding biomass power generation or waste power generation, a case where the amount of generated power is not stable may occur because the properties of raw materials such as biomass and garbage (waste, sludge, and the like) are generally not stable and due to temporary mixing of unsuitable materials for incineration.

The hydrogen production unit 23 has a function of producing hydrogen by water electrolysis. Generally, the water electrolysis method includes a PEM (solid polymer) type water electrolysis method and an alkaline water electrolysis method, and the hydrogen production unit 23 can adopt either method. The hydrogen production unit 23 produces hydrogen by using a predetermined amount of power in response to a control command from the management unit 21. That is, the hydrogen production unit 23 adjusts the amount of power consumption in response to the control command from the management unit 21. In this manner, the hydrogen production unit 23 can adjust the power consumption of the power.

The hydrogen storage unit 24 has a function of storing hydrogen produced by the hydrogen production unit 23. The hydrogen stored in the hydrogen storage unit 24 may be, for example, filled in a girdle or hydrogen trailer by a hydrogen compressor and transported to a hydrogen demand area, or hydrogen may be supplied to a fuel cell vehicle (FCV) locally through a dispenser (the latter is called an on-site hydrogen station). In addition, hydrogen may be supplied from the hydrogen storage unit 24 to another hydrogen demand area through the pipeline. In any case, it is assumed that hydrogen is discharged from the microgrid 2 to the outside by appropriate transportation or the like.

A plurality of hydrogen production units 23 and a plurality of hydrogen storage units 24 may be provided, and each of these may operate independently.

In addition, as described above, the hydrogen production unit 23 is used as power consumption equipment for adjusting the transmission and reception (hereinafter, transmission and reception may be referred to as "transmission and reception" of power) of power in the microgrid 2, and the hydrogen storage unit 24 is used to store hydrogen produced by consuming power by the hydrogen production unit 23. The power consumption equipment in the microgrid 2 is not limited to the hydrogen production unit 23 described above, and other power consumption equipment may be adopted. For example, an electric boiler may be used as an alternative to the hydrogen production unit 23, and a steam accumulator may be used as an alternative to the hydrogen storage unit 24.

The power load unit 25 (load unit) consumes power. The power load unit 25 is, for example, a power consumer, and uses the received power for a desired purpose. The power load unit 25 can be realized as a set of equipment groups that consume power. As a specific configuration of the power load unit 25, for example, a server or air conditioning forming the energy management system 3 that controls the microgrid 2 can be mentioned. In addition, the power load unit 25 (power consumer) may be equipment (for example, a hydrogen compressor, an air compressor, and a cooling tower) related to the hydrogen production unit 23 and the hydrogen storage unit 24. In addition, the power load unit 25 (power consumer) may include a low-voltage consumer, such as a general household.

The energy storage unit 26 stores and releases power in the microgrid 2. That is, the energy storage unit 26 can adjust the amount of stored power by charging and discharging. In the present embodiment, the energy storage unit 26 is, for example, a stationary storage battery. The energy storage unit 26 is, for example, a lithium ion battery (LiB). The energy storage unit 26 may be another secondary battery such as a lead storage battery or a redox flow, or may be another type of energy storage device such as a flywheel battery. In addition, the energy storage unit 26 may be configured by combining the above-described battery, energy storage device, and the like. Generally, a storage battery as the energy storage unit 26 has a faster response speed (20 microseconds or less) than a water electrolyzer as the hydrogen production unit 23 or an electric boiler. In addition, when the energy storage unit 26 is a storage battery, it is assumed that a storage battery PCS for converting the direct current of the storage battery into alternating current or a remaining storage battery level monitoring device is also included in the energy storage unit 26.

Hereinafter, in the present embodiment, the storage of power in the energy storage unit 26 is referred to as "charging", and the release of power in the energy storage unit 26 is referred to as "discharging". The energy storage unit 26 charges and discharges power in the microgrid 2 in response to a control command from the management unit 21. The energy storage unit 26 adjusts the charge power or the discharge power in response to a control command from the management unit 21.

The EMS 3 has a function of creating a plan for adjusting the power transmitted and received between the microgrid 2 and the external power system 90. As shown in FIG. 2, the EMS 3 includes an external communication unit 31, a control unit 32, a power demand prediction unit 33, and an RE generated power prediction unit 34.

The amount of power transmitted and received between the microgrid 2 to and from the external power system 90 can be adjusted based on the planned value. As a mechanism to secure the instant supply-demand balance of power that cannot be easily stored unlike general assets, instead of the conventional actual simultaneous and equal amount system, a planned value same time and same amount system has been introduced with the full liberalization of the retail market in April 2016. Under this system, a difference (imbalance) between the plan submitted by the power generation company or the retailer before the actual supply and demand and the actual power generation and demand results is adjusted by the general power transmission company using the adjusting power source. On the other hand, the cost required for adjusting the imbalance is collected through the imbalance fee based on the market price on the Japan Electric Power Exchange. In this mechanism, the microgrid 2 is required to transmit and receive the power to and from the external power system 90, the amount of power being set based on the planned value created and submitted by a power company 95, for example. In addition, since the difference from the planned value is an imbalance, the microgrid 2 is required to transmit and receive the power to and from the external power system 90 so that the difference from the planned value is reduced. Therefore, by transmitting a signal for controlling the operation of each unit forming the microgrid 2 to each unit, the EMS 3 controls each unit so that the power transmitted to and received from the external power system 90 follows the planned value.

In addition, in each unit shown in FIG. 2, among various functions of the EMS 3, only the function for maintaining the transmitted power or received power (hereinafter, these may be collectively referred to as "system power") to the external power system 90 at the planned value as described above is described. Descriptions of other functions of the EMS 3, for example, a user interface, a database function, and a monitoring function, are omitted.

The external communication unit 31 of the EMS 3 communicates with, for example, the power company 95 or the like to notify the power company 95 of the planned value relevant to the transmitted power or received power (hereinafter, these may be collectively referred to as "system power") from the microgrid 2 to the external power system 90, and transmits the planned value to the control unit 32.

The control unit 32 has a function of controlling the hydrogen production unit 23 and the energy storage unit 26 based on the planned value and based on a predicted value of power demand from the power demand prediction unit 33, a predicted value of renewable energy power generation from the RE generated power prediction unit 34, a measured value of received power from the received power measurement unit 27, and a measured value of transmitted power from the transmitted power measurement unit 28.

The control unit 32 instructs the hydrogen production unit 23 to produce hydrogen by water electrolysis by transmitting a power consumption command to the hydrogen production unit 23. In addition, the control unit 32 controls the charge/discharge power in the energy storage unit 26 by transmitting a charge/discharge command to the energy storage unit 26. In addition, information regarding the remaining capacity of the energy storage unit 26 (for example, the remaining capacity of the storage battery) is acquired from the control unit 32. This information is used to determine the content of the command from the control unit 32 to the hydrogen production unit 23 and the energy storage unit 26.

As described above, it is assumed that the control unit 32 can acquire at least the current system power (measured value of the power measurement unit) and the remaining capacity of the energy storage unit 26 (storage battery), can send a charge/discharge command to the energy storage unit 26, and can send a power consumption command to the hydrogen production unit 23. In addition, it is assumed that the planned value of the system power has already been acquired by the control unit 32 through the external communication unit 31 before the planning period. In addition, the planned value may be determined internally in the EMS 3, and the power company 95 (or the power market) may be notified in advance by external communication. As described above, the main body that creates the planned value of the system power may be the EMS 3 or an external device.

The power demand prediction unit 33 predicts the power demand in the microgrid 2 in a predetermined period in the future. In addition, the RE generated power prediction unit 34 predicts the generated power of the renewable energy (renewable energy generated power) in a predetermined period in the future. This information is used to determine the content of the command from the control unit 32 to the hydrogen production unit 23 and the energy storage unit 26.

The method of prediction by the power demand prediction unit 33 and the RE generated power prediction unit 34 is not particularly limited, and a known method can be appropriately used. The simplest prediction method is, for example, to predict that the power demand and the renewable energy generated power at the present time obtained by measurement or calculation will continue at a fixed value in the future (0th-order hold). If the power demand is stable, such a simple method is also effective. As a more advanced method, there is a method of performing prediction by applying machine learning to past power demand data, power data of renewable energy power generation, and other pieces of data (for example, weather data, traffic data, information on days of the week and national holidays, holiday information, and factory production plans). Examples of the machine learning method include a linear multiple regression model, a support vector regression model, a JIT (just-in-time) model, and a neural network model. As described above, the method of prediction by the power demand prediction unit 33 and the RE generated power prediction unit 34 is not particularly limited.

[Details of Calculation by the Control Unit: Power Adjustment Method]

Next, details of calculation (power adjustment method) by the control unit 32 of the EMS 3 will be described. In addition, the following description will be given on the assumption that the power generation by the RE power generation unit 22 is "renewable energy power generation", the hydrogen production unit 23 is "hydrogen production equipment", the power load unit 25 is a "power consumer", and the energy storage unit 26 is a "storage battery".

Figure 3:
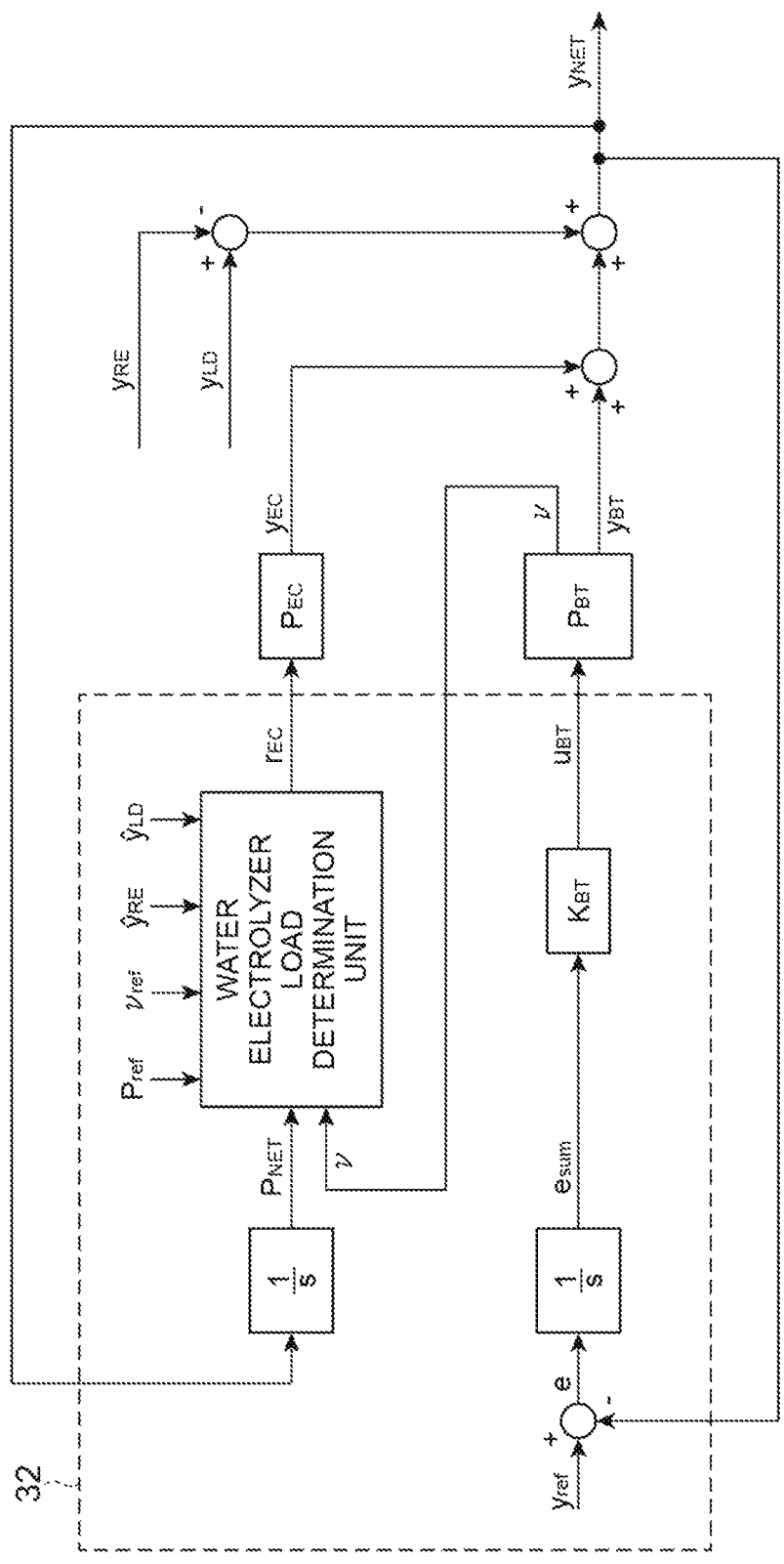
FIG. 3 is a block diagram showing signal transmission in a control unit of the EMS.

FIG. 3 is a block diagram showing signal transmission in the control unit 32. FIG. 3 includes a diagram relevant to signal transmission outside the control unit 32, in addition to the calculation portion by the control unit 32. The symbol $1/s$ in FIG. 3 indicates an integrator. In addition, the explanation of each symbol included in FIG. 3 is shown in Table 1 below.

TABLE 1

| Symbol | Descriptions |
|---|---|
| $y_{ref}$ | System power target value |
| e | Difference between target value and actual value of system power |
| $e_{sum}$ | Integrated value of error e. integration error |
| $y_{EC}$ | Power consumption of hydrogen production equipment |
| $r_{EC}$ | Power consumption target value of hydrogen production equipment |
| $y_{BT}$ | Charge/discharge power of storage battery (positive indicates power reception, and negative indicates power transmission) |
| $u_{BT}$ | Command value of charge/discharge power to storage battery |
| v | Remaining power storage (remaining capacity) of storage battery |

TABLE 1-continued

| Symbol | Descriptions |
|---|---|
| $y_{LD}$ | Power consumption of power consumer |
| $y_{NET}$ | System power (positive indicates power reception, and negative indicates power transmission) |
| $y_{RE}$ | Renewable energy generated power |
| $P_{NET}$ | Integrated value (amount of system power) of system power $y_{NET}$ in planned section |
| $P_{ref}$ | Target value (target trajectory) of system power $y_{NET}$ in planned section |
| $v_{ref}$ | Target value of remaining power storage of storage battery |
| $\hat{y}_{RE}$ | Predicted value of renewable energy generated power |
| $\hat{y}_{LD}$ | Predicted value of power demand |
| $P_{EC}$ | Plant model of hydrogen production equipment |
| $K_{BT}$ | Control block of storage battery |
| $P_{BT}$ | Plant model of storage battery |

Before explaining the details of the calculation in the control unit 32 of the EMS 3, the "planned value same time and same amount" required by the microgrid 2 will be described.

Figure 4:
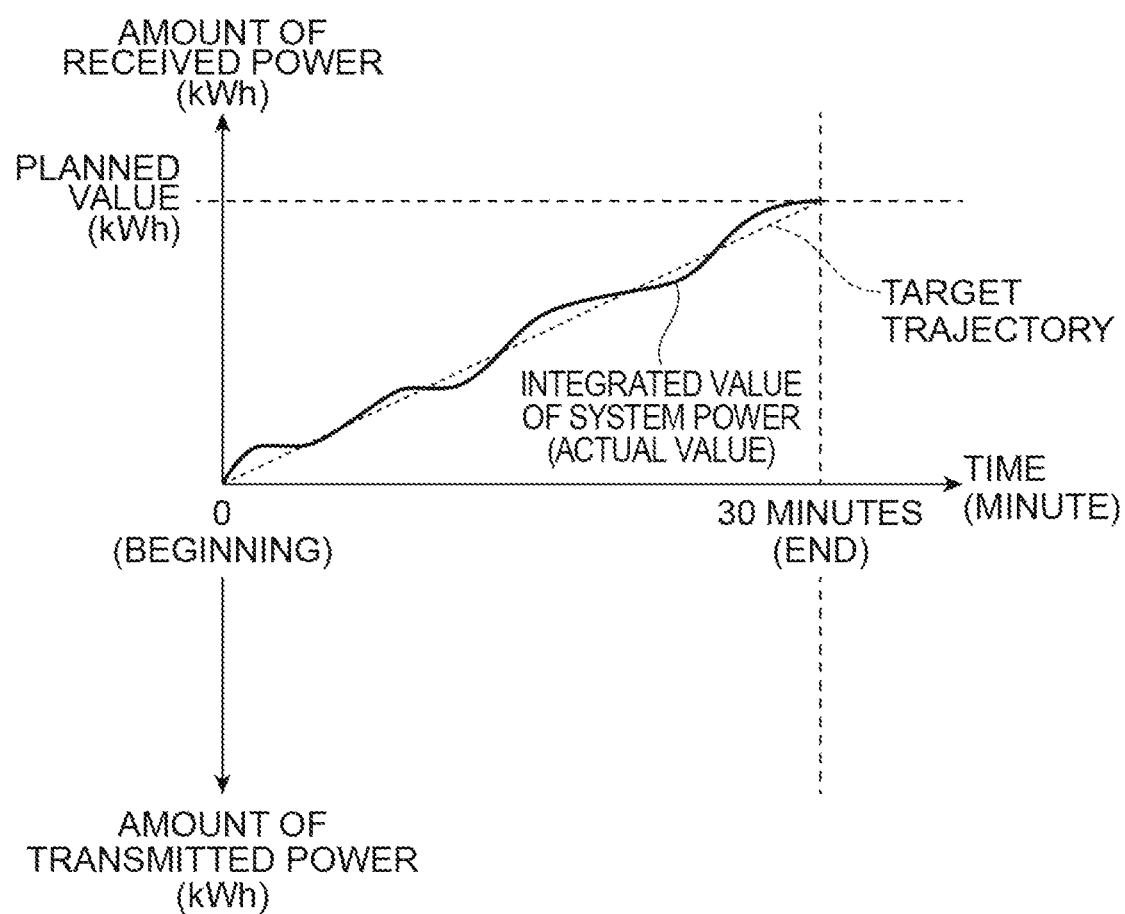
FIG. 4 is a diagram describing the concept of "planned value same time and same amount" control.

FIG. 4 shows a conceptual diagram of "planned value same time and same amount" control. In FIG. 4, the horizontal axis indicates time, and the vertical axis indicates the amount of system power (positive indicates power reception, and negative indicates power transmission). The microgrid 2 makes the integrated value of the system power (the amount of transmitted power or the amount of received power) match or asymptotically approach the planned value at the end of the planned section (section that is the unit for calculating the planned value) by using its own adjusting power (here, a water electrolyzer and a storage battery). Therefore, feedback control is performed so that the actual value of the system power follows a target trajectory set in advance. The target trajectory relevant to the system power is a fluctuation curve of the integrated value of the system power within the planned section, which is set to make the system power match the planned value at the end of the planned time. Therefore, the target trajectory should be 0 at the beginning of the planned section and match the planned value at the end of the planned section. In addition, in the present embodiment, the planned section is described as 30 minutes as an example. However, the time length depends on the form of a contract with the power company or the power market.

Hereinafter, the operation of how the microgrid realizes "planned value same time and same amount" will be described.

First, it is assumed that the planned value is given at the beginning of the planned section. The control unit 32 calculates a target trajectory $P_{ref}$ and a system power target value $y_{ref}$ based on the planned value. Specifically, assuming that the planned value is A [kWh] and the planned time length is T time (in the case of 30 minutes, T=0.5 h), the system power target value $y_{ref}$ is given by A/T [kW]. The target trajectory $P_{ref}$ is given by $y_{ref} \times t$ (where t is the elapsed time from the beginning of the plan). It is assumed that the amount of system power $P_{NET}$ is zero at the beginning of the planned section.

Figure 5:
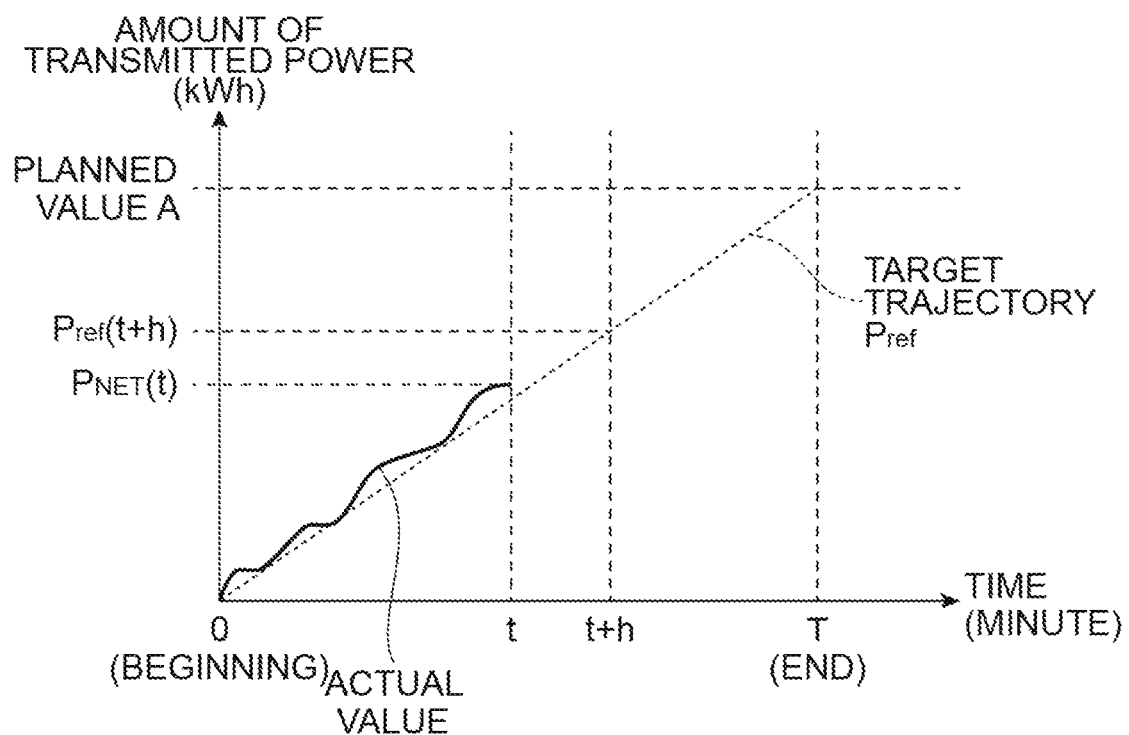
FIG. 5 is a diagram describing the operation of a water electrolyzer load determination unit in FIG. 3.

FIG. 5 is a diagram illustrating the operation of a "water electrolyzer load determination unit" in the block diagram shown in FIG. 3. This operation operates every h [seconds]. Here, it is assumed that the operation period h [sec] is obtained by dividing the planned time length T [sec] by a natural number. That is, it is assumed that there is a predetermined natural number N and T=Nh is satisfied. For example, assuming that T is 30 minutes=30*60 seconds and N is 6, h is 5 minutes=5*60 seconds. It is desirable that the operation period h is longer than the time constant of the water electrolyzer. N may be 1.

Here, a case where the elapsed time from the beginning of the plan is t (t=0, h, 2h, ..., (N−1)h) is considered. Here, a target value $r_{EC}$ of the water electrolyzer in a section from time t to t+h is determined by the following policies.

Policy 1: Match the amount of system power at future time t+h to the target trajectory by using the storage battery and the water electrolyzer. Here, it is assumed that the output of the water electrolyzer is constant in the section of t to t+h.

Policy 2: Make the remaining storage battery level at the future time t+h asymptotically approach the target value $v_{ref}$ as much as possible.

First, the Policy 1 is mathematically expressed. Focusing on Expression (1), which is the relational expression of the system power in the microgrid 2, and Expression (2), which is the relational equation of the storage battery, the amount of system power $P_{NET}(t+h)$ at time t+h can be described as the following Expression (3).

[Expression 1]
$$y_{RE} + y_{NET} = y_{LD} + y_{EC} + y_{BT} \quad (1)$$

[Expression 2]
$$v(t+h) = v(t) + \int_{t}^{t+h} y_{BT} dt \quad (2)$$

[Expression 3]
$$\begin{aligned} P_{NET}(t+h) &= P_{NET}(t) + \int_{t}^{t+h} y_{NET} dt \\ &= P_{NET}(t) + \int_{t}^{t+h} y_{LD} + y_{EC} + y_{BT} - y_{RE} dt \\ &= P_{NET}(t) + \int_{t}^{t+h} y_{BT} dt + \int_{t}^{t+h} y_{EC} dt + \int_{t}^{t+h} y_{LD} - y_{RE} dt \\ &= P_{NET}(t) + v(t+h) - v(t) + hy_{EC} + \int_{t}^{t+h} \hat{y}_{LD} - \hat{y}_{RE} dt \end{aligned} \quad (3)$$

From the above Policy 1, since $P_{NET}(t+h)=P_{ref}(t+h)$, the above Expression (3) can be rearranged with respect to v(t+h) to obtain the following Expression (4).

[Expression 4]
$$v(t+h) = P_{ref}(t+h) + v(t) - P_{NET}(t) - \int_{t}^{t+h} (\hat{y}_{LD} - \hat{y}_{RE}) dt - hy_{EC} \quad (4)$$

In the above Expression (4), all are known except for the power consumption $y_{EC}$ of the water electrolyzer and the future remaining storage battery capacity v(t+h). This is because $P_{ref}(t+h)$ is the value of the target trajectory at the future time, v(t) is the current remaining capacity of the storage battery, $P_{NET}(t)$ is the current system power, and the term described using the integral symbol is obtained by integrating is the predicted values of renewable energy generated power and power demand.

Next, the Policy 2 is mathematically expressed. Assuming that the set of possible power consumption target values of the water electrolyzer is $R_{EC}$, Policy 2 can be expressed by the following Expression (5).

[Expression 5]
$$\min_{y_{EC} \in R_{EC}} |v(t+h) - v_{ref}| \quad (5)$$

Under the constraints of the above Expression (4), the power consumption target value $r_{EC}=y_{EC}$ of the water electrolyzer is obtained by solving the optimization problem that minimizes the objective function (evaluation function) of Expression (5). In addition, the set $R_{EC}$ of possible power consumption target values of the water electrolyzer is practically expressed by a finite set $R_{EC}=\{r_1, r_2, \ldots, r_M\}$ (M is a natural number). For example, assuming that the maximum power consumption of the water electrolyzer is 1000 kW, there is a case of $R_{EC}=\{0, 100, 200, \ldots, 1000\}$. In such a case, it is possible to calculate $|v(t+h)-v_{ref}|$ at $r_i$ by substituting $r_i$ into $y_{EC}$ in Expression (4). By performing a calculation for all i=1, 2, ..., M to find i that minimizes $|v(t+h)-v_{ref}|$, $r_{EC}=r_i$ becomes the optimum value. Thus, the optimum value may be obtained by so-called round-robin calculation. In addition, the future remaining storage battery capacity v(t+h) obtained herein is not particularly used for the storage battery.

After calculating the power consumption target value according to the above procedure, the control unit 32 adjusts the charge/discharge power of the storage battery by system power feedback control.

This will be described below with reference to FIG. 3. The control unit 32 obtains an integration error $e_{sum}$ by time-integrating the difference between the system power target value $y_{ref}$ and the system power measurement value $y_{NET}$. In addition, the integration error $e_{sum}$ corresponds to the difference between the integrated value of the system power and the target trajectory in FIG. 4. Even if the system power integrated value temporarily deviates from the target trajectory due to the presence of the integrator 1/s, the system power integrated value can be restored by feedback control. In addition, when there is no integrator, the system power measurement value $y_{NET}$ follows the target value $y_{ref}$. However, there is no mechanism for the integrated value of the system power measurement value $y_{NET}$ to approach the planned value. For this reason, once the integrated value deviates greatly from the target trajectory due to disturbance or the like, the amount of imbalance may increase.

In the above procedure, the power consumption of the water electrolyzer is determined based on the predicted value, but the storage battery compensates for the predicted deviation that may occur with respect to the predicted value. This can be achieved because the responsiveness of the storage battery is faster than that of the power consumption device.

A deviation signal corresponding to the integration error $e_{sum}$ is connected to a controller for a storage battery (control block $K_{BT}$ for a storage battery in FIG. 3). As the controller, for example, using a PI controller can be adopted. A command value $u_{BT}$ of charge/discharge power to the storage battery is determined in the controller.

The power consumption $y_{EC}$ of the hydrogen production equipment and the charge/discharge power $y_{BT}$ of the storage battery calculated by the above procedure are added to the power consumption $y_{LD}$ of the power consumer and the renewable energy generated power $y_{RE}$, so that the system power $y_{NET}$ (measured value) of the microgrid is determined.

Finally, at the end of the planned section, the integrator accumulating the error is reset (that is, at the next beginning, the integration error $e_{sum}$ is set to zero). In addition, the integration error $e_{sum}$ at the end corresponds to the amount of imbalance (kWs) of the corresponding planned section. After performing an appropriate unit conversion (for example, converting kWh to kWh), the integration error $e_{sum}$ at the end may be saved and communicated.

In the EMS 3, it is possible to adjust the system power so that the amount of imbalance becomes smaller by performing the above-described series of procedures every h [seconds] which is a predetermined unit time.

[Simulation]

It was confirmed by simulation that the amount of imbalance of the system power could be suppressed by performing the calculations by the above control unit. The simulation results will be described with reference to FIGS. 6 to 11.

First, the performance of each piece of equipment included in the microgrid 2 was set as follows.

Power consumption of hydrogen production equipment: rated 1000 kW

Storage battery: capacity of 500 kWh, charge/discharge power of 400 kW

Figure 6:
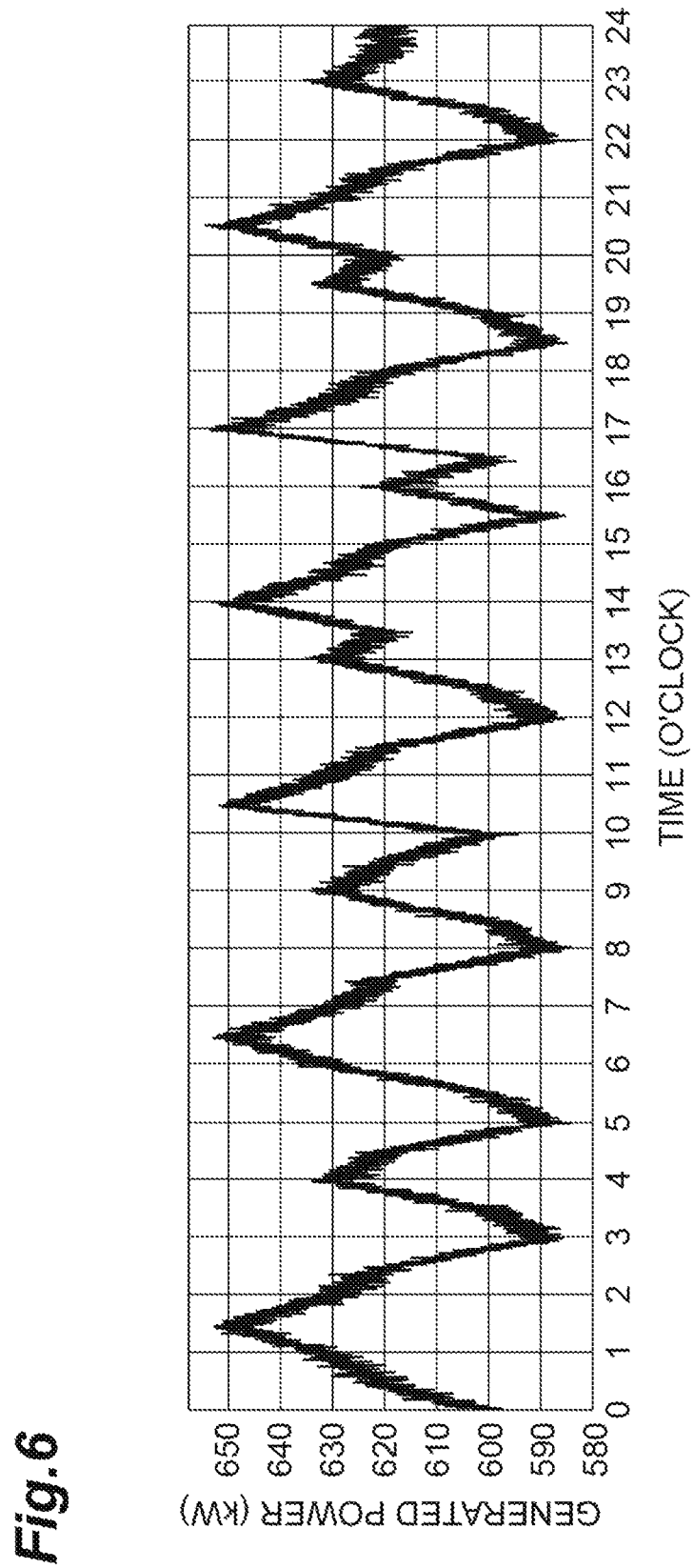
FIG. 6 is a diagram describing simulation conditions.

Here, FIG. 6 shows the renewable energy generated power $y_{RE}$ in the RE power generation unit 22 in the microgrid 2. The target section of the simulation was set to 24 hours from 0:00 to 24:00, and the power generation capacity in this section was set as shown in FIG. 6. It can be seen that in this setting, the generated power fluctuates from 600 kW to 650 kW and is not constant. Such a waveform may be obtained, for example, when the RE power generation unit 22 is geothermal power generation or waste power generation.

In addition, the power consumption $y_{LD}$ of the power consumer in each unit of the microgrid 2 was set to 100 kW, and the target value $v_{ref}$ of the remaining storage battery capacity was set to 250 kWh. A 0th-order hold method was used for the renewable energy power generation prediction and the power demand prediction. In addition, the control device for the storage battery was a PI controller. The set of possible power consumption target values of the water electrolyzer was $R_{EC}=\{0, 10, 20, \ldots, 1000\}$ (optimized from 0 kW to 1000 kW in 10 kW increments). The optimization was a round robin of 100 patterns as described above. In addition, the unit length T of the planned section was set to 30 minutes, and the operation period of the water electrolyzer load determination unit was set to 5 minutes=300 seconds.

Figure 7:
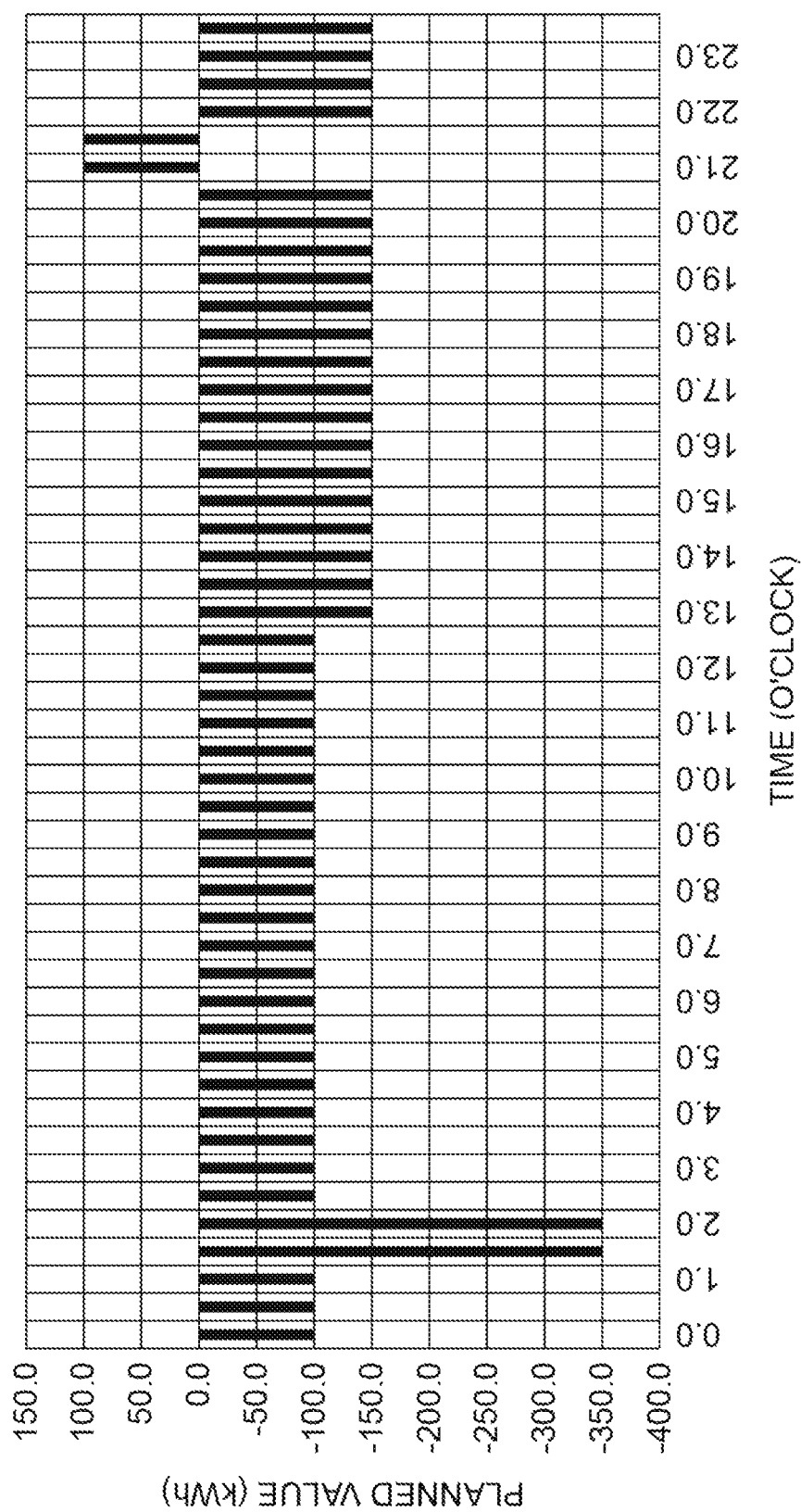
FIG. 7 is a diagram describing simulation conditions.

FIG. 7 shows the setting of planned values (for 48 points) of the system power for 24 hours in a simulation target section. In addition, it is sufficient that the planned value of the corresponding section is determined before the current time, and it is not necessary to know planned values at all 48 points at 0:00 of the simulation start time. In addition, between 1:30 and 2:30 and between 21:00 to 22:00, discontinuous values are set as compared with the values in the adjacent sections. This is set on the assumption that power is exchanged with the outside of the microgrid 2 by demand response or the like. In particular, between 1:30 and 2:30, 700 kWh is planned to be transmitted in one hour. This value is the amount of power equal to or greater than the renewable energy generated power (see FIG. 6) of the RE power generation unit 22.

Under the above conditions, a simulation was performed according to the block diagram shown in FIG. 3 and the above-described calculation contents. FIGS. 8 to 11 are diagrams showing the results.

Figure 8:
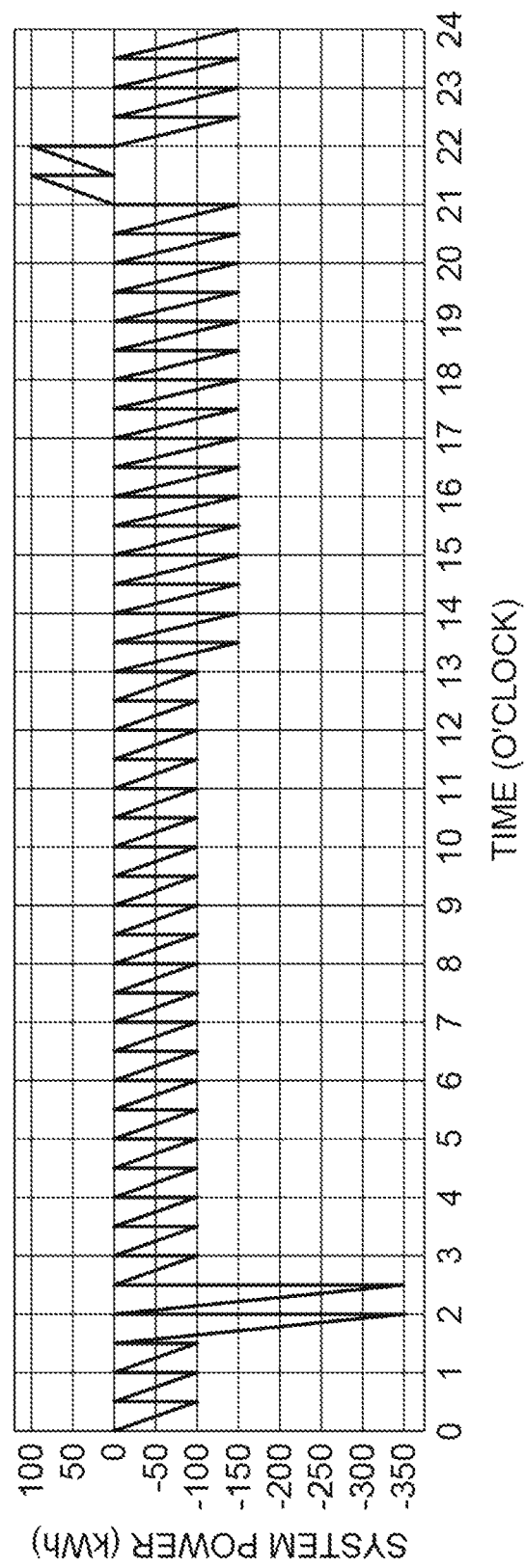
FIG. 8 is a diagram describing a simulation result.

FIG. 8 is an integrated value of the system power of the microgrid (corresponding to the actual value shown in FIG. 4). In addition, the unit is kWh. It can be seen that the amount of system power matches the planned value (see FIG. 7) with high accuracy at the end of each planned section (in units of 30 minutes). That is, it can be confirmed that "planned value same time and same amount" can be achieved.

Figure 9:
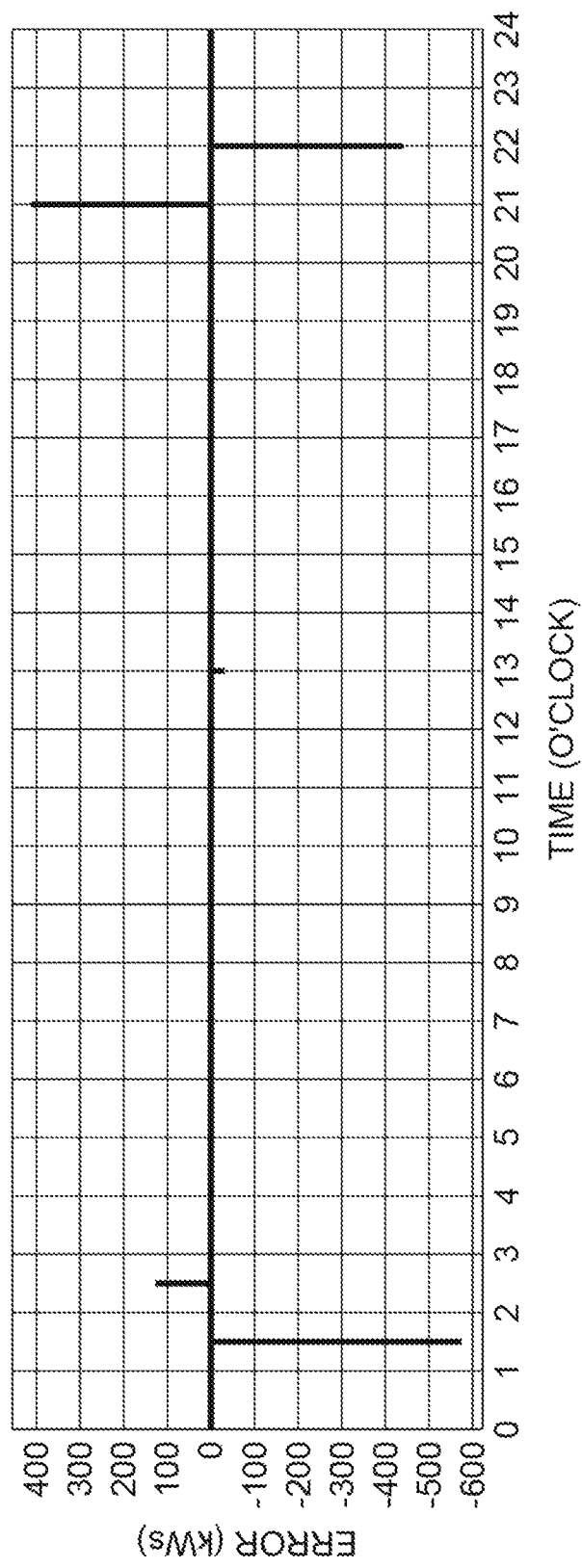
FIG. 9 is a diagram describing a simulation result.

FIG. 9 shows the integration error $e_{sum}$ at each time. In addition, the unit is kWs. It was confirmed that the error was about 600 kWs=0.16 kWh even at the largest error. Thus, it can be confirmed that the renewable energy generated power can follow the target trajectory with high accuracy even though the renewable energy generated power fluctuates.

Figure 10:
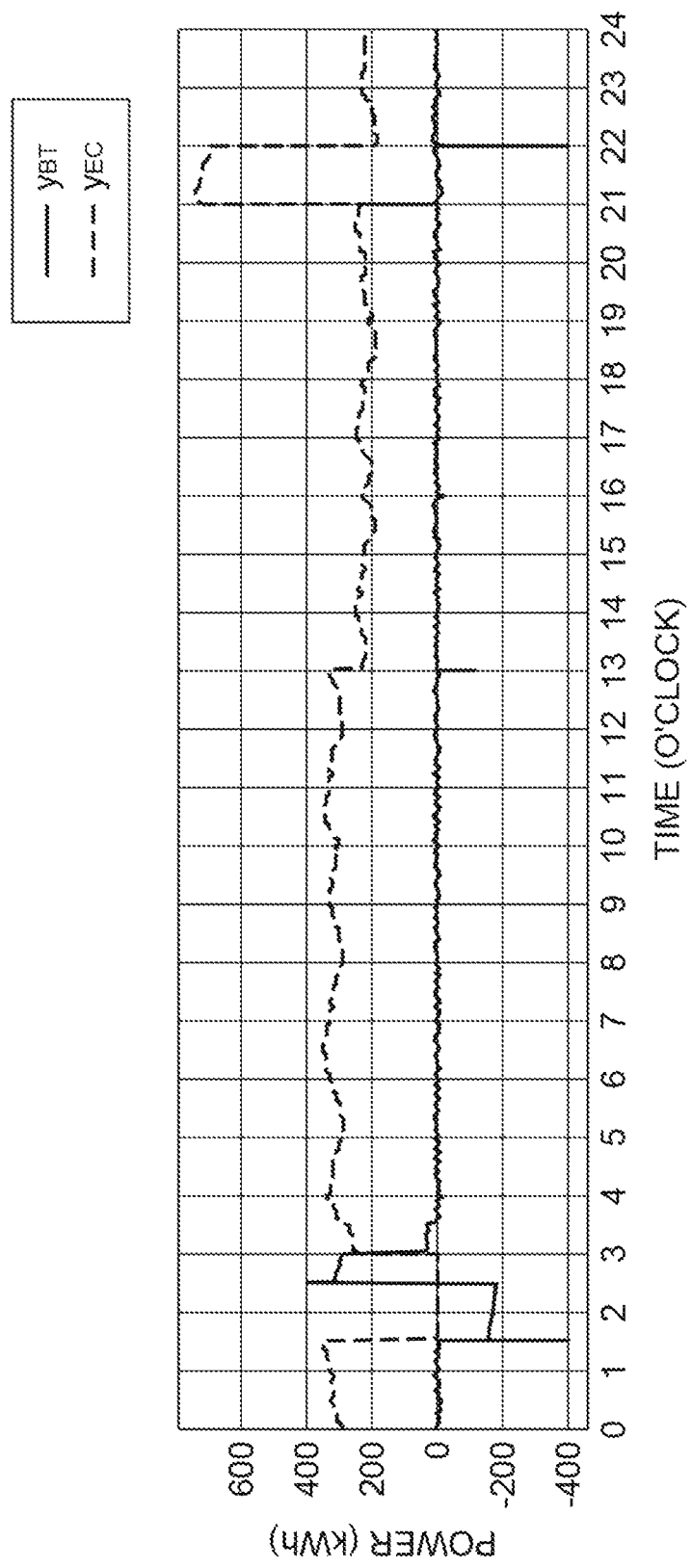
FIG. 10 is a diagram describing a simulation result.

FIG. 10 shows the power consumption $y_{EC}$ of the water electrolyzer and the charge/discharge power $y_{BT}$ of the storage battery at each time. From the results shown in FIG. 10, it can be confirmed that the water electrolyzer mainly consumes power against fluctuations in the renewable energy generated power and the storage battery makes fine adjustments.

Figure 11:
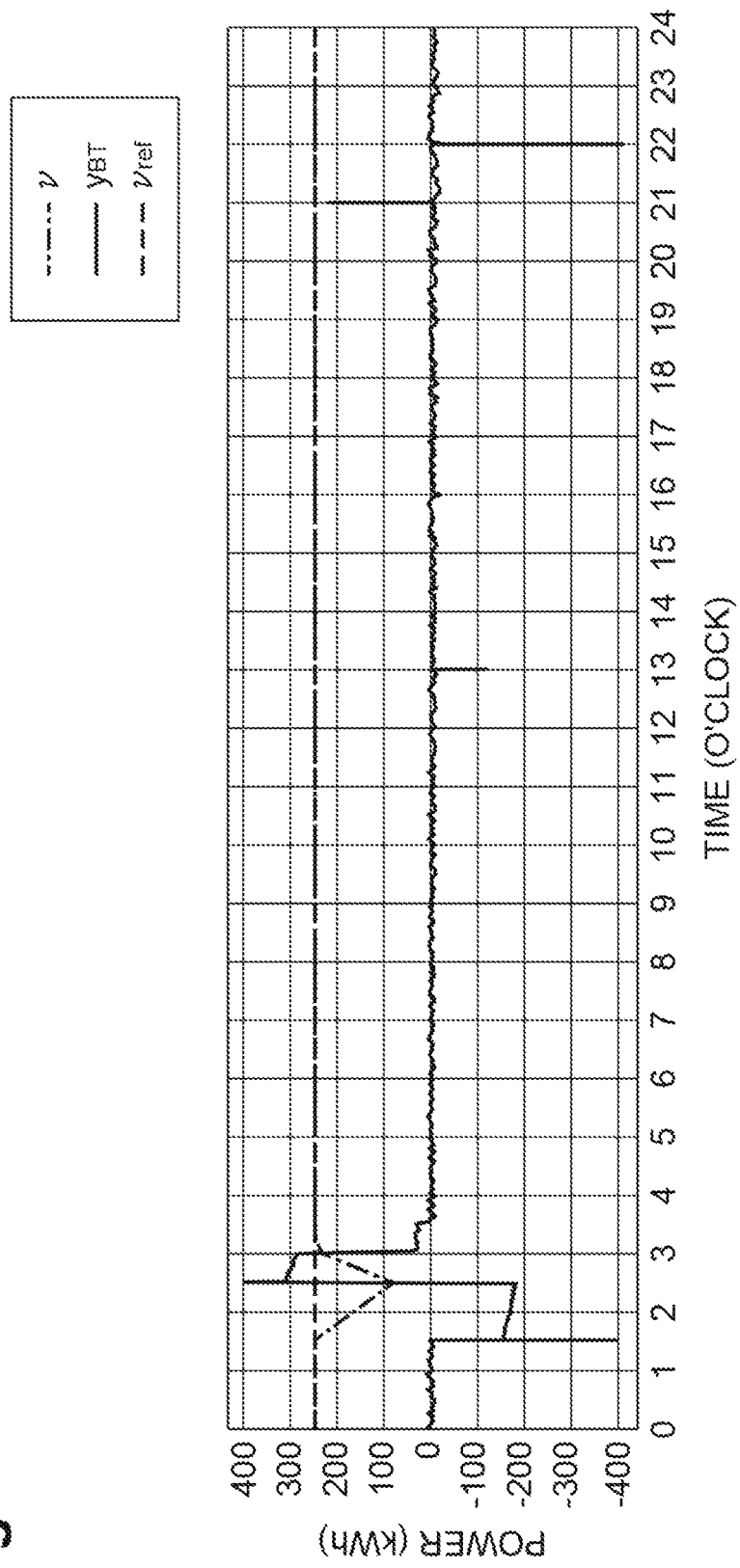
FIG. 11 is a diagram describing a simulation result.

FIG. 11 shows the remaining capacity v of the storage battery and its target value $v_{ref}$. From the results shown in FIG. 11, it can be confirmed that since the storage battery is operated without significantly deviating from the target value $v_{ref}$, it is possible to avoid a situation in which the storage battery is fully charged or over-discharged to lose the adjusting power.

Referring to the above simulation results, it can be seen that since the planned value is larger than the amount of generated power from 1:30 to 2:30, "planned value same time and same amount" is achieved by completely stopping the water electrolyzer to suppress the power consumption in the microgrid 2 and by adding the discharge of the storage battery to the power generated by the RE power generation unit 22 and transmitting the power obtained as a result of the addition. In addition, after 2:30, the water electrolyzer is not restarted immediately, and the storage battery is charged by the power generated by the RE power generation unit 22, so that the remaining storage battery capacity is restored to the target value. Thus, it is confirmed that the ability to adjust the imbalance is quickly restored by securing the remaining storage battery capacity to some extent.

Modification Examples

The above embodiment is one form according to the present disclosure. The present disclosure is not necessarily limited to the form described above, and various changes can be made without departing from the gist thereof. Hereinafter, a modification example will be described.

In the above, a PI controller has been exemplified as a controller (control block $K_{BT}$ shown in FIG. 3) for a storage battery, but the type of controller is not limited. For example, a P controller, an I controller, a PID controller, a PD controller, an I-PD controller, and a two-degree-of-freedom PID controller can be used. In addition, the controller may be designed by using a theory, such as H2 control theory or H∞ control theory.

In addition, although the case where the feedback control is performed in the continuous time has been described above, a control system may be designed in the discrete time with the same idea. In addition, the controller can also be changed according to the control design. For example, a velocity type PID controller (called a velocity form) may be used as a PID controller. The velocity type PID controller is often used as a method for preventing integrator windup in discrete-time PID design.

Various parameters and the like used in the above calculation can be changed as appropriate. Hereinafter, a modification example relevant to parameter setting and the like will be described.

In the above, the target value $v_{ref}$ of the remaining storage battery level is fixed for 24 hours, but the target value can be changed. The target value of the remaining storage battery level may be manually set by the operator, may be created in the EMS 3, or may be distributed from the outside of the EMS 3 at fixed time intervals. For example, if the weather forecast is fine weather, the target value of the remaining storage battery level may be set to a trajectory that rises (charges) during the daytime and falls (discharges) after sunset, and if the weather forecast is rainy weather, the target value of the remaining storage battery level may be always set to an intermediate value as in the embodiment described above. With such a setting, renewable energy sources during the daytime can be shifted to nighttime when the weather is fine (power shift).

Figure 12:
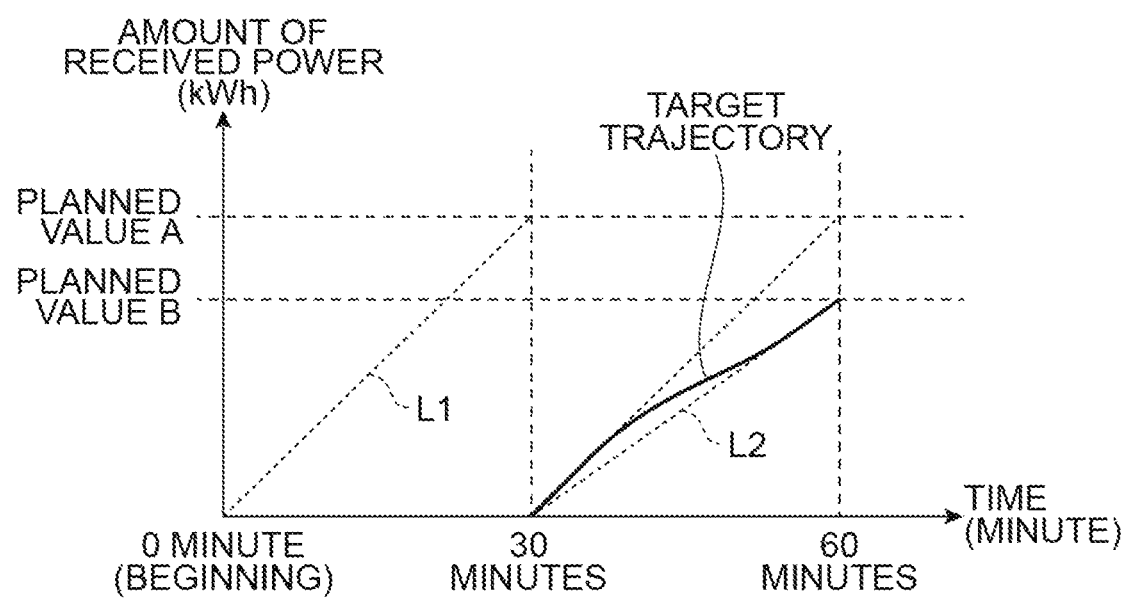
FIG. 12 is a diagram describing a modification example.

In the above, as the system power target value $y_{ref}$, an average value obtained by dividing the planned value of the amount of power by the time length was adopted. However, there is a degree of freedom in designing the target trajectory $P_{ref}$ (see FIG. 4) or the system power target value $y_{ref}$ which is a derivative thereof. For example, as in an example shown in FIG. 12, a target trajectory may be used in which the slope of the target trajectory at the beginning of a predetermined planned section is equal to the slope of the average target trajectory L1 in the previous planned section and the slope at the end is equal to the slope of the average target trajectory L2 in the section. In this case, since the system power target value $y_{ref}$ is continuous at the change point between different sections, it becomes easy to realize a smooth transition when the control content is changed. Therefore, improvements in control performance can be expected.

Figure 13:
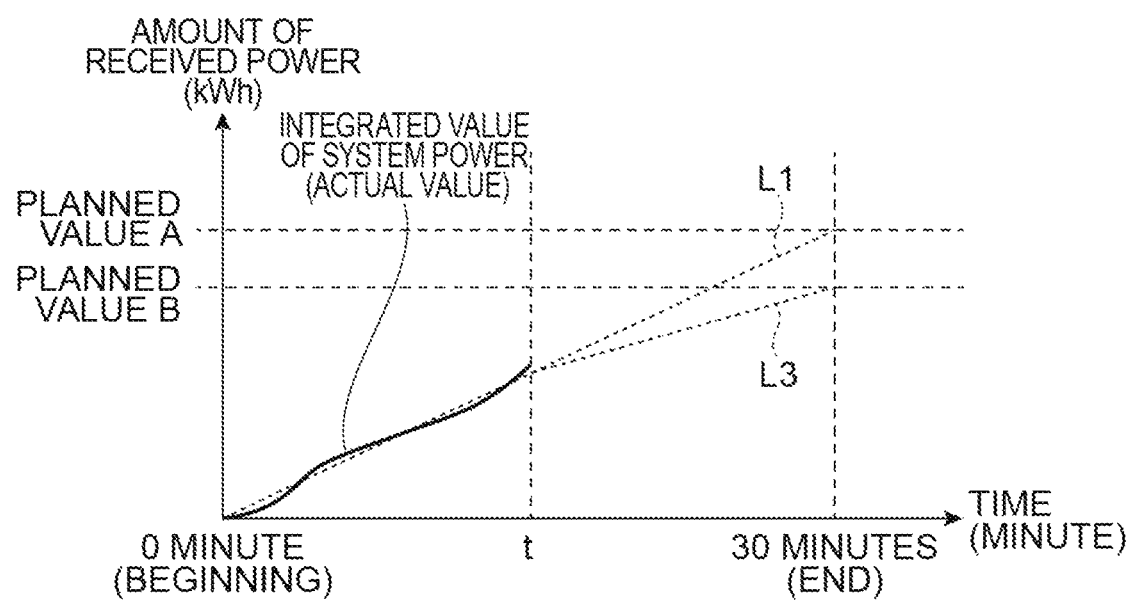
FIG. 13 is a diagram describing a modification example.

In the above description, it is assumed that the planned value of the planned section is given in advance every 30 minutes. However, the planned value may be changed during the section. An example of trajectory correction in such a case is shown in FIG. 13. In FIG. 13, according to the change of the planned value from A to B at time t, the target trajectory L1 is changed to the target trajectory L2 at time t (or the start timing of the unit time of the calculation after time t). In the demand response mechanism, the planned value can be changed within the planned section. The calculation described in the present embodiment can also easily cope with such conditions.

In FIG. 3, the deviation between the integrated value of the system power and the target trajectory is expressed by using the system power target value $y_{ref}$. However, the block diagram shown in FIG. 3 can be changed, and the value used for each control can be changed according to the change. For example, the target trajectory $P_{ref}$ may be directly changed to a configuration used for feedback control by changing the arrangement of the integrator 1/s from the block diagram of FIG. 3.

In addition, in FIG. 3, the integrator 1/s before the integration error $e_{sum}$ may be omitted. In this case, the storage battery controller controls the charging and discharging of the storage battery so that the system power $y_{NET}$ asymptotically approaches the system power target value $y_{ref}$. Since there is no integrator, the storage battery itself does not operate so that the deviation between the integrated value of the system power and the target trajectory is reduced. However, since the water electrolyzer controls the power consumption so as to asymptotically approach the target trajectory, it can be expected that such a large imbalance will not occur at the end. In addition, since it can be expected that the system power will be more stable if the system power yar is directly feedback-controlled without an integrator, there may be no integrator when it is desired to avoid imbalance and at the same time avoid a large fluctuation in the system power itself.

In the above embodiment, the case where there are one power consumption device (hydrogen production equipment) and one storage battery has been described, but there may be a plurality of power consumption devices and a plurality of storage batteries. When there are a plurality of power consumption devices and a plurality of storage batteries, it is possible to handle this case by changing the descriptions of the above-described expressions and the like or adding the constraint conditions in consideration of the number, functions, and the like of the devices.

As shown in the above Expression (4), if the integrated value of the renewable energy generated power and the power demand at time t to t+h (that is, the predicted value of the electric energy kWh, not the predicted value of the power kW) is known, the same calculation as in the above embodiment can be performed.

In the above embodiment, "Policy 1: Match the amount of system power at future time t+h to the target trajectory by using the storage battery and the water electrolyzer. Here, it is assumed that the output of the water electrolyzer is constant in the section of t to t+h." and "Policy 2: Make the remaining storage battery level at the future time t+h asymptotically approach the target value $v_{ref}$ as much as possible." have been described. However, the time at which the amount of system power matches the target trajectory in Policy 1 may be set to an end T instead of t+h. In addition, the time of asymptotical approach in Policy 2 may also be set to the end T. In this case, the predicted values of the renewable energy generated power and the power demand are required from t to T. This point is different from the condition that a predicted value from t to t+h is sufficient as described in the above embodiment. When the prediction accuracy is high and the fluctuation in the renewable energy generated power is large, it may be possible to further reduce the amount of imbalance at the end by setting the matching time to the end. In this manner, the settings in Policies 1 and 2 may be changed in consideration of the characteristics of the microgrid 2.

In the above, the optimization of the target value $r_{EC}$ of the power consumption of the water electrolyzer is a round-robin calculation. However, the optimum solution may be obtained analytically, or may be obtained by using an optimization solver based on formulation using a linear programming method or the like. In addition, the evaluation function shown in Expression (5) is not limited to this. For example, as shown in the following Expression (6), the square may be used. In addition, since v(t+h) is a scalar, the case of the square shown in Expression (6) and the case of the absolute value shown in Expression (5) are substantially the same. Therefore, the same solution is obtained.

[Expression 6]

$$\min_{y_{EC} \in R_{EC}} (v(t+h) - v_{ref})^2 \quad (6)$$

Figure 14:
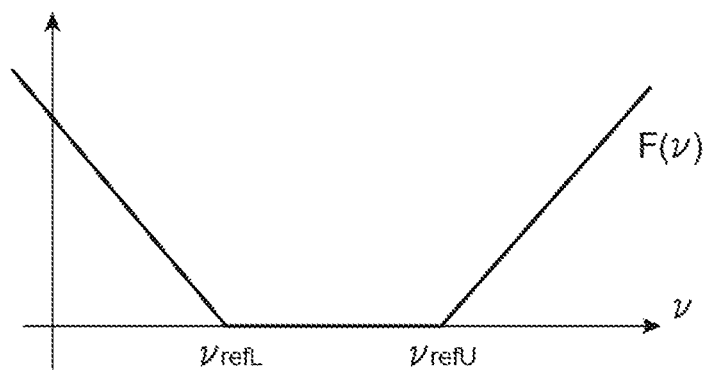
FIG. 14 is a diagram describing a modification example.

In addition, the above may be defined as shown in the following Expression (7) by using a function F defined in FIG. 14. In this case, the target value of the power consumption of the water electrolyzer is determined so that the remaining capacity v is maintained within a range having a predetermined width.

[Expression 7]

$$\min_{y_{EC} \in R_{EC}} F(v(t+h)) \quad (7)$$

In addition, the evaluation function described by Expression (5) may have a different coefficient depending on the sign of $v(t+h)-v_{ref}$. Specifically, the evaluation function may be changed to that shown in the following Expression (8). In addition, in Expression (8), $w_+$ and $w_- \geq 0$ are appropriate weighting coefficients.

[Expression 8]

$$\min_{y_{EC} \in R_{EC}} w_+ \max(v(t+h) - v_{ref}, 0) + w_- \max(v_{ref} - v(t+h), 0) \quad (8)$$

In addition, the time of the target trajectory to be matched in Policy 1 described above may not be one point in the future but may be a plurality of points. For example, it is conceivable that assuming that the current time is t, the matching time is two points, T and 2T (T is the length of the planned section).

Figure 15:
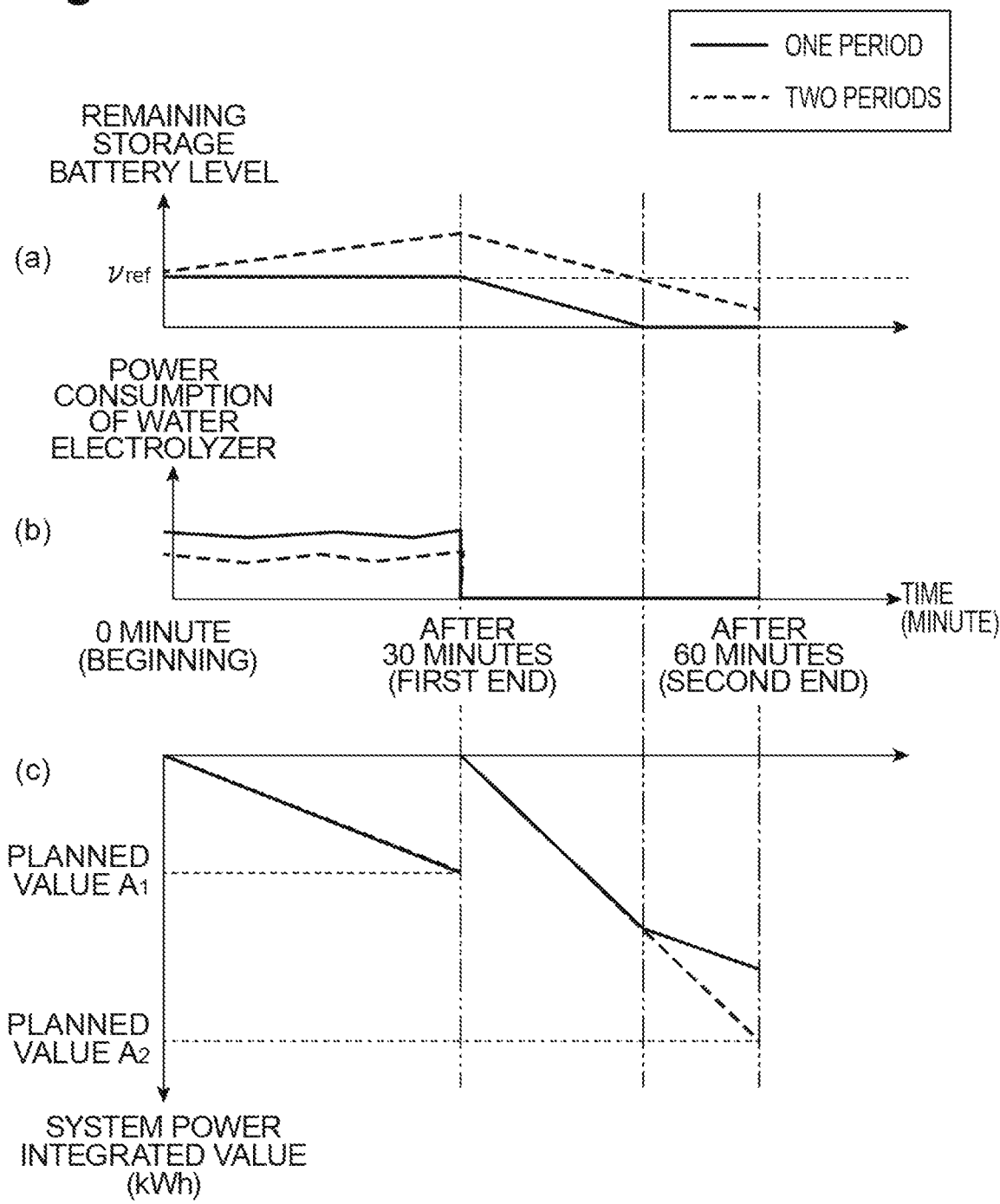
FIGS. 15(*a*), 15(*b*), and 15(*c*) are diagrams describing a modification example.

The merit of extending the matching time to the future will be described with reference to FIG. 15. In FIG. 15, each time transition of the remaining storage battery capacity (FIG. 15(a)), the power consumption of the water electrolyzer (FIG. 15(b)), and the system power integrated value (FIG. 15(c)) is expressed in two sections (0 to 2T). In addition, FIG. 15 shows simulation results when the matching time is set to only one period (T only) and when the matching time is set to two periods (T and 2T). In addition, it is assumed that the planned value of the system power integrated value in the first section (after 0 to 30 minutes; first period) is $A_1$ and the planned value of the system power integrated value in the second section (after 30 minutes to 60 minutes; second period) is $A_2$.

When calculation is performed for only one period, in the first section (after 0 to 30 minutes), it is possible to avoid the imbalance while making the remaining storage battery capacity v asymptotically approach the target value $v_{ref}$. In the second section (after 30 minutes to 60 minutes), however, since the planned value exceeds the amount of renewable energy generated power, the water electrolyzer is stopped to further discharge the storage battery, but imbalance cannot be avoided due to the insufficient remaining storage battery capacity.

On the other hand, in the case of two periods (T and 2T), it is assumed that the matching time is two points, T and 2T, and $y_{EC1}$ and $y_{EC2}$ are the power consumption of the water electrolyzer in the first and second planned sections, respectively (here, only the optimum solution, $y_{EC1}$, is actually delivered to the water electrolyzer as a command value, and $y_{EC2}$ is not used). At this time, the evaluation function of optimization is set as the following Expression (9).

[Expression 9]

$$\min_{y_{EC1}, y_{EC2} \in R_{EC}} G(v(T)) + G(v(2T)) \quad (9)$$

Figure 16:
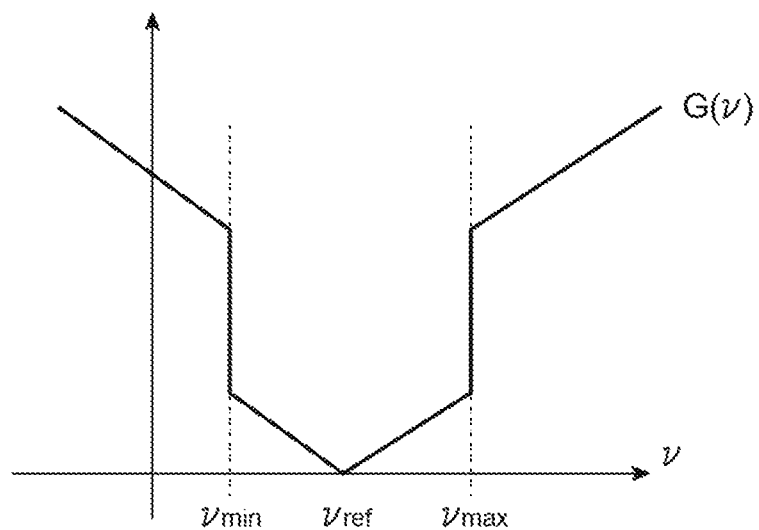
FIG. 16 is a diagram describing a modification example.

In addition, a function G in Expression (9) is a function shown in FIG. 16. In FIG. 16, $v_{min}$ and $v_{max}$ are the operation lower limit and the operation upper limit of the remaining storage battery level, respectively. The function G takes the minimum value at $V_{ref}$, and the value of the function G increases greatly in a region exceeding the upper and lower limits of operation $v_{min}$ and $v_{max}$. This means that a large penalty is given for v(T) and v(2T) exceeding the upper and lower limits of operation. Such a function may be called a barrier function.

The results of determining the load of the water electrolyzer and determining the remaining storage battery level by using the above Expression (9) are shown in FIGS. 15(a) to 15(c). When the matching time is two periods, as compared with the case of one period, it can be seen that the power consumption of the water electrolyzer is reduced in the first planned section to achieve "planned value same time and same amount" in the first planned section while charging the storage battery by that amount. In addition, in the second planned section, the water electrolyzer is similarly stopped to discharge the storage battery, but the remaining storage battery capacity at the beginning of the second planned section is higher than that in the case of one period. Therefore, it can be seen that "planned value same time and same amount" is also achieved in the second section without running out of the remaining storage battery capacity.

Figure 17:
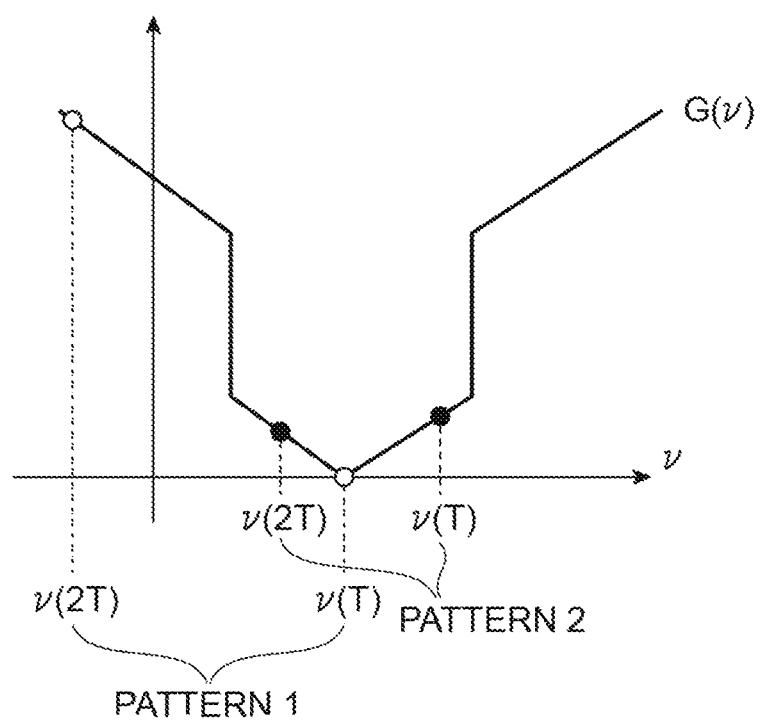
FIG. 17 is a diagram describing a modification example.

It is easy to understand from FIG. 17 whether or not the optimum solution in the case of two periods is the result shown in FIG. 15. The case where only one period is taken into consideration is shown as pattern 1, and the case where two periods are taken into consideration is shown as pattern 2. In pattern 1, G(v(T)) is zero, but G(v(2T)) is a very large value because v(2T) exceeds the operation area. On the other hand, in the case of pattern 2, both G(v(T)) and G(v(2T)) are small, and accordingly, the sum is also small. By making the prediction section longer in this manner, the remaining storage battery level can be operated more effectively in order to avoid future imbalance. Even when the matching time is three points (for example, T, 2T, and 3T) and four points (for example, T, 2T, 3T, and 4T), the calculation can be performed in the same manner.

In the above, the fluctuation in the renewable energy generated power $y_{RE}$ is predicted, but when the RE power generation unit 22 generates power with solar power, the generated power may be smoothed by using the storage battery or the like. In such a case, since it is less difficult to predict the smoothed signal, the predicted value of the smoothed $y_{RE}$ may be used instead of the above-described $y_{RE}$.

In addition, the above discussion may be conducted by using SOC [%] (100*(v/H)) obtained by normalizing the remaining storage battery capacity v [kWh] with the storage battery capacity H [kWh]. In this case, the target value $v_{ref}$ [kWh] of the remaining storage battery level becomes the target value [%] of the SOC. The essence of the discussion remains unchanged from that described in the above embodiment.

In the above embodiment, the power consumption of the water electrolyzer is constant from time t to t+h. However, when h is about the same as or shorter than the time constant of the water electrolyzer, the dynamics of the power consumption of the water electrolyzer may be a problem. In this case, by considering the dynamics of the water electrolyzer (for example, regarding $y_{EC}$ and $r_{EC}$ as a temporary delay system), the calculation can be performed so that these match each other at time t+h as in the above embodiment. In this manner, h can be set to a shorter period.

In the above optimization problem, the upper and lower limits of the charge/discharge power yar of the storage battery may be considered. In addition, it is also possible to consider the upper and lower limit constraints of the system power $y_{NET}$. The former is determined by the hardware performance of the storage battery. The latter is determined by the content of the contract with the power company that manages the commercial system.

When the number of points for matching the integrated value of the system power with the target trajectory increases, it may not be possible to realize the matching at all points due to the upper and lower limit constraints of the charge/discharge power of the storage battery. In such a case, the sum of the integrated value of the system power at each point and the absolute value difference of the target trajectory may be added to the optimization objective function in addition to the term relevant to the remaining storage battery level. Although matching is not possible, the effect of asymptotic approach can be expected.

As described above, the content of calculation specifically described in the above embodiment includes various conditions, but these conditions can be changed as appropriate. When changing various conditions, it is possible to cope with the change by changing the expressions used for the calculation according to the content of the change. In addition, it may be possible to cope with the change by changing the constraint conditions in the optimization problem according to the changed conditions. As described above, the content of calculation described in the above embodiment is merely an example, and can be changed according to the conditions of the microgrid 2.

[Hardware Configuration]

Figure 18:
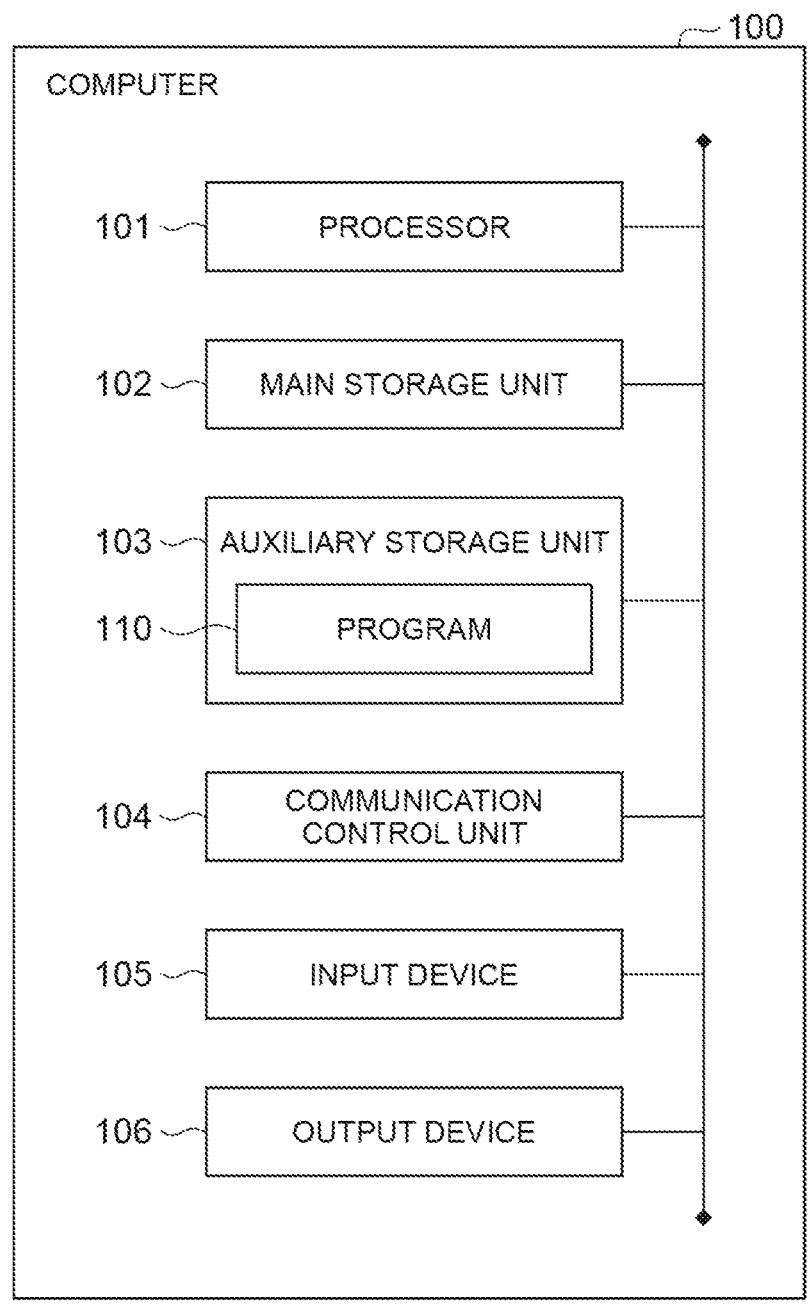
FIG. 18 is a diagram showing an example of the hardware configuration of an energy management system.

The hardware configuration of the EMS 3 will be described with reference to FIG. 18. FIG. 18 is a diagram showing an example of the hardware configuration of the EMS 3. The EMS 3 includes one or more computers 100. The computer 100 includes a CPU (Central Processing Unit) 101, a main storage unit 102, an auxiliary storage unit 103, a communication control unit 104, an input device 105, and an output device 106. The EMS 3 is configured by one or more computers configured by these hardware components and software such as a program.

When the EMS 3 is configured by a plurality of computers 100, these computers 100 may be connected locally, or may be connected through a communication network such as the Internet or an intranet. By this connection, one EMS 3 is logically constructed.

The CPU 101 executes an operating system, an application program, and the like. The main storage unit 102 is configured to include a read only memory (ROM) and a random access memory (RAM). The auxiliary storage unit 103 is a storage medium, such as a hard disk and a flash memory. The auxiliary storage unit 103 generally stores a larger amount of data than the main storage unit 102. The communication control unit 104 is a network card or a wireless communication module. At least a part of the external communication unit 31 may be realized by the communication control unit 104. The input device 105 is configured to include a keyboard, a mouse, a touch panel, a microphone for voice input, and the like. The output device 106 is configured to include a display, a printer, and the like.

The auxiliary storage unit 103 stores a program 110 and data necessary for processing in advance. The program 110 causes the computer 100 to execute each functional element of the EMS 3. By the program 110, for example, processing relevant to the above-described power adjustment method is performed in the computer 100. For example, the program 110 is read by the CPU 101 or the main storage unit 102, and operates at least one of the CPU 101, the main storage unit 102, the auxiliary storage unit 103, the communication control unit 104, the input device 105, and the output device 106. For example, by the program 110, data is read from and written into the main storage unit 102 and the auxiliary storage unit 103.

The program 110 may be provided after being recorded on a tangible recording medium, such as a CD-ROM, a DVD-ROM, or a semiconductor memory. The program 110 may be provided as a data signal through a communication network.

[Functions]

According to the power adjustment device and the power adjustment method described above, by simultaneously controlling the power consumption in the hydrogen production unit 23 as a power consumption unit and the charge/discharge power in the energy storage unit 26 as a power storage unit, adjustments are made to transmit and receive power based on the planned value determined for each planned section to and from the external power supply system (external power system 90). By combining the adjustment of the power consumption in the power consumption unit (hydrogen production unit 23) having a low response speed and the adjustment of the charge/discharge power in the power storage unit (for example, a storage battery), which has a high response speed but of which cost tends to be high, it is possible to adjust the amount of transmitted and received power with high accuracy while suppressing the cost.

Conventionally, various methods for transmitting and receiving power based on a planned value to and from the external power supply system have been studied. In general, for example, when it is realized to transmit and receive power while avoiding imbalance only with a power storage unit such as a storage battery, a storage battery having a large capacity is required. For this reason, it has been studied to make an adjustment by combining the power consumption unit and the power storage unit. However, how to specifically combine the power consumption unit and the power storage unit has not been sufficiently studied. For this reason, control to determine the operation of the other side depending on the state of one side, for example, operating the power consumption unit when the remaining capacity of the power storage unit exceeds a threshold value, has been studied. However, no more detailed study has been done.

More specifically, for example, since a storage battery has a capacity, it is necessary to appropriately maintain the battery capacity within a predetermined range. If the storage battery is fully charged, storage battery cannot be charged any more, so that the adjusting power is lost. On the other hand, a power consumption unit such as a water electrolyzer generally has a lower response speed than a storage battery. Therefore, it is considered that if the control that depends on the water electrolyzer is performed, following in a case where a fluctuation in the amount of generated power is large becomes difficult. In particular, when there is a generator having an abrupt fluctuation, such as a solar power generator or a wind power generator, in the microgrid, there is a possibility that the response to the fluctuation will be insufficient if the response speeds or the characteristics of the above two types of devices (power consumption unit and power storage unit) are not considered.

On the other hand, in the power adjustment device and the power adjustment method described above, it is possible to perform control in consideration of the different characteristics of the power consumption unit and the power storage unit by simultaneously performing the adjustment of the power consumption in the power consumption unit (hydrogen production unit 23) having a low response speed and the adjustment of the charge/discharge power in the power storage unit (for example, a storage battery), which has a high response speed but of which cost tends to be high. Therefore, it is possible to adjust the amount of transmitted and received power with high accuracy while suppressing the cost.

In addition, in the adjustment, the target value of the power consumption in the power consumption unit (hydrogen production unit 23) is determined at a period of the planned section or a period shorter than the planned section, and the charge/discharge power in the energy storage unit 26 is controlled so that the difference between the target trajectory, which is a fluctuation curve of the integrated value of the power transmitted and received to and from the external power supply system in the planned section for realizing the planned value, and the integrated actual value of the power transmitted and received to and from the external power supply system is reduced. In this case, by determining the target value of the power consumption in the power consumption unit having a lower response speed than the power storage unit at a period of the planned section or a period shorter than the planned section, it is possible to make a rough adjustment based on the planned value by using the power consumption unit. On the other hand, the charge/discharge power in the energy storage unit 26 is controlled so that the difference between the target trajectory and the integrated actual value of the power transmitted and received to and from the external power supply system is reduced. That is, the difference between the target trajectory and the integrated actual value can be adjusted smaller by adjustment using the energy storage unit 26 having a higher response speed than the power consumption unit. In addition, since the adjustment range of the energy storage unit 26 can be reduced, it is possible to prevent an increase in the size of the energy storage unit 26.

In addition, in the adjustment, the target value of the power consumption in the power consumption unit (hydrogen production unit 23) may be determined so that the integrated value of the power transmitted and received to and from the external power supply system matches or asymptotically approaches the target trajectory at the time of at least one predetermined point in the future by using the predicted value or the current value of the power demand in the microgrid 2. By determining the target value of the power consumption in the power consumption unit so that the integrated value of the transmitted and received power matches or asymptotically approaches the target trajectory by using the predicted value or the current value of the power demand in the microgrid 2, it is possible to adjust the amount of transmitted and received power more accurately in consideration of the power demand.

The microgrid 2 may further have a power generation unit (RE power generation unit 22) that generates power. In the adjustment, the target value of the power consumption in the power consumption unit (hydrogen production unit 23) may be determined so that the integrated value of the power transmitted and received to and from the external power supply system matches or asymptotically approaches the target trajectory at a time of at least one predetermined point in a future by using a current value or a predicted value relevant to the power generated by the power generation unit. By determining the target value of the power consumption in the power consumption unit so that the integrated value of the transmitted and received power matches or asymptotically approaches the target trajectory by using the predicted value or the current value relevant to the power generated by the power generation unit, it is possible to adjust the amount of transmitted and received power more accurately in consideration of the amount of generation by the power generation unit.

In the adjustment, the target value of the power consumption in the power consumption unit may be determined so that the remaining capacity of the energy storage unit 26 is within the target range at the time of at least one predetermined point in the future. In this case, since the target value of the power consumption in the power consumption unit is determined so that the remaining capacity of the energy storage unit 26 is within the target range, the remaining capacity of the power storage unit can be maintained in an appropriate state. Therefore, feedback control using the storage battery can be continued. If the remaining storage battery capacity is not taken into consideration when determining the target value of the power consumption, over-discharge/full charge may occur. Then, feedback control may not be possible, and accordingly, control performance may be degraded. However, this can be avoided.

In addition, in the adjustment, the target value of the power consumption in the power consumption unit (hydrogen production unit 23) may be determined at a period of the planned section or a period shorter than the planned section, and the charging and discharging in the power storage unit may be controlled so that the difference between the target value of the power transmitted and received to and from the external power supply system in order to realize the planned value and the actual value of the power transmitted and received to and from the external power supply system is reduced. In this case, it is possible to make a rough adjustment based on the planned value by using the power consumption unit. On the other hand, by adopting the configuration in which the charge/discharge power in the power storage unit is controlled so that the difference between the target value of the power transmitted and received to and from the external power supply system in the planned section and the actual value of the power transmitted and received to and from the external power supply system is reduced, the difference between the target value and the actual value can be adjusted smaller by adjustment using the power storage unit having a higher response speed than the power consumption unit. Since the adjustment by the power storage unit is a fine adjustment, it is possible to prevent an increase in the size of the power storage unit.

As described above, the present disclosure is not necessarily limited to the embodiment described above, and various changes can be made without departing from the gist thereof.

[Supplementary Note]

The adjusting power source for eliminating the imbalance is mainly thermal power generation. In order to eliminate the imbalance, it is necessary to perform a partial output operation with a margin for both raising and lowering while activating a plurality of units. This is not a desirable operation from the viewpoint of power generation efficiency, and may lead to an increase in power generation unit price, an increase in $CO_2$ emissions, and the like. Therefore, suppressing/eliminating the imbalance is relevant not only to the economic efficiency or business profitability of a specific microgrid but also to the economic energy supply or environmental load reduction of society as a whole. Therefore, this technology contributes to Goal 7, "Ensure access to affordable, reliable, and sustainable modern energy for all", and Goal 13, "Take urgent action to mitigate climate change and its impacts", of the United Nations-led Sustainable Development Goals (SDGs).

Hydrogen has been drawing attention as a next-generation energy source. In particular, hydrogen produced by a method that significantly reduces $CO_2$ emissions is called "$CO_2$-free hydrogen". This technology contributes to the production of $CO_2$-free hydrogen because hydrogen can be produced by using the surplus power of renewable energy. In addition, this technology shows a control method for suppressing the volatility, which is a problem in the renewable energy source, and contributes to the spread and expansion of the renewable energy source itself. For this reason, this technology also contributes to the following targets of the United Nations-led Sustainable Development Goals (SDGs).

Target 7.2 "By 2030, significantly increase the proportion of renewable energy in the global energy mix."

Target 9.3 "By 2030, improve sustainability by improving resource utilization efficiency and improving infrastructure and industries through the introduction and expansion of clean technology and environment-friendly technology/industrial processes. All countries will make efforts according to their abilities."

This technology is suitable for the planned value same time and same amount system through the power market, but the planned value same time and same amount control is also a necessary technique in other systems. For example, even in the case of self-consignment by a company or the like using the power transmission and distribution network of a general power company, the power transmission side and the power reception side may be restricted by the "planned value same time and same amount". Even in the case of self-consignment, it is possible to control the amount of system power in a predetermined section to a target value by using this technology. Incidentally, in recent years, an international initiative called RE100, which aims to cover 100% of the power used by a company with renewable energy, has been drawing attention. Generally, in a high-rise building in an urban area where a head office of a company or the like is located, there is no space for installing solar power generation equipment or wind power generation equipment enough to cover the consumption of the entire building. Therefore, as one of the measures to realize RE100, self-consignment from the renewable energy power generation equipment located in various places to a high-rise building, such as a head office, can be considered. As described above, in the self-consignment system, since both the power transmission side and the power reception side should comply with the "planned value same time and same amount", the application of this technology is expected. Therefore, this technology also contributes to the promotion of RE100.

REFERENCE SIGNS LIST

1: power supply system, 2: microgrid, 3: energy management system (power adjustment device), 21: management unit, 22: RE power generation unit (power generation unit), 23: hydrogen production unit (power consumption unit), 24: hydrogen storage unit, 25: power load unit, 26: energy storage unit (power storage unit), 27: received power measurement unit, 28: transmitted power measurement unit, 31: external communication unit, 32: control unit, 33: power demand prediction unit, 34: RE generated power prediction unit, 90: external power system, 95: power company.

The invention claimed is:

1. A power adjustment method in a microgrid connected to an external power supply system and having a power storage unit capable of adjusting an amount of stored power by charging and discharging and a power consumption unit capable of adjusting power consumption of the power, the method comprising:
adjusting transmission and reception of the power by simultaneously controlling the power consumption in the power consumption unit and charge/discharge power in the power storage unit in order to transmit and receive power based on a planned value determined for each planned section to and from the external power supply system,
wherein, in the adjustment, a target value of the power consumption in the power consumption unit is determined at a period of the planned section or a period shorter than the planned section, and the charge/discharge power in the power storage unit is controlled so that a difference between a target trajectory, which is a fluctuation curve of an integrated value of the power transmitted and received to and from the external power supply system in the planned section for realizing the planned value, and an integrated actual value of the power transmitted and received to and from the external power supply system is reduced.

2. The power adjustment method according to claim 1, wherein, in the adjustment, the target value of the power consumption in the power consumption unit is determined so that the integrated value of the power transmitted and received to and from the external power supply system matches or asymptotically approaches the target trajectory at a time of at least one predetermined point in a future by using a predicted value or a current value of a power demand in the microgrid.

3. The power adjustment method according to claim 2, wherein, the microgrid further has a power generation unit that generates the power, and in the adjustment, the target value of the power consumption in the power consumption unit is determined so that the integrated value of the power transmitted and received to and from the external power supply system matches or asymptotically approaches the target trajectory at a time of at least one predetermined point in a future by using a current value or a predicted value relevant to the power generated by the power generation unit.

4. The power adjustment method according to claim 2, wherein, in the adjustment, the target value of the power consumption in the power consumption unit is determined so that a remaining capacity of the power storage unit is within a target range at a time of at least one predetermined point in a future.

5. A power adjustment method in a microgrid connected to an external power supply system and having a power storage unit capable of adjusting an amount of stored power by charging and discharging and a power consumption unit capable of adjusting, power consumption of the power, the method comprising:
adjusting transmission and reception of the power by simultaneously controlling the power consumption in the power consumption unit and charge/discharge power in the power storage unit in order to transmit and receive power based on a planned value determined for each planned section to and from the external power supply system,
wherein, in the adjustment, a target value of the power consumption in the power consumption unit is determined at a period of the planned section or a period shorter than the planned section, and the charging and discharging in the power storage unit are controlled so that a difference between a target value of the power transmitted and received to and from the external power supply system in order to realize the planned value and an actual value of the power transmitted and received to and from the external power supply system is reduced.

6. A power adjustment device in a microgrid connected to an external power supply system and having a power storage unit capable of adjusting an amount of stored power by charging and discharging and a power consumption unit capable of adjusting power consumption of the power, the device comprising:
- at least one processor,
  - wherein the at least one processor adjusts transmission and reception of the power by simultaneously controlling the power consumption in the power consumption unit and charge/discharge power in the power storage unit in order to transmit and receive power based on a planned value determined for each planned section to and from the external power supply system, and
  - wherein, in the adjustment, a target value of the power consumption in the power consumption unit is determined at a period of the planned section or a period shorter than the planned section, and the charge/discharge power in the power storage unit is controlled so that a difference between a target trajectory, which is a fluctuation curve of an integrated value of the power transmitted and received to and from the external power supply system in the planned section for realizing the planned value, and an integrated actual value of the power transmitted and received to and from the external power supply system is reduced.

* * * * *